US012647214B2

(12) United States Patent
Kim

(10) Patent No.: US 12,647,214 B2
(45) Date of Patent: Jun. 2, 2026

(54) METHOD AND APPARATUS FOR CONFIGURING SIDELINK FEEDBACK CHANNEL OF VEHICLE-TO-EVERYTHING TERMINAL IN COMMUNICATION SYSTEM

(71) Applicant: ELECTRONICS AND TELECOMMUNICATIONS RESEARCH INSTITUTE, Daejeon (KR)

(72) Inventor: Seon Ae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 147 days.

(21) Appl. No.: 18/500,021

(22) Filed: Nov. 1, 2023

(65) Prior Publication Data

US 2024/0146464 A1     May 2, 2024

(30) Foreign Application Priority Data

Nov. 1, 2022     (KR) ........................ 10-2022-0143474
Oct. 31, 2023     (KR) ........................ 10-2023-0148195

(51) Int. Cl.
    H04L 1/1812     (2023.01)
    H04L 5/00     (2006.01)
    H04W 72/40     (2023.01)
(52) U.S. Cl.
    CPC .......... *H04L 1/1816* (2013.01); *H04L 5/0055* (2013.01); *H04W 72/40* (2023.01)

(58) Field of Classification Search
    CPC ..... H04L 1/1816; H04L 5/0055; H04W 72/40
    See application file for complete search history.

(56) References Cited

U.S. PATENT DOCUMENTS

| | | | |
|---|---|---|---|
| 11,082,954 B2 | 8/2021 | Huang et al. | |
| 11,324,017 B2 | 5/2022 | Lee et al. | |
| 11,503,569 B2 | 11/2022 | Choi et al. | |
| 2021/0203453 A1 | 7/2021 | Kim et al. | |
| 2021/0376959 A1* | 12/2021 | Yang ..................... | H04L 1/1887 |
| 2022/0060286 A1* | 2/2022 | Yoshioka .............. | H04L 1/1854 |
| 2022/0159649 A1 | 5/2022 | Ko et al. | |
| 2022/0201654 A1 | 6/2022 | Lee et al. | |
| 2022/0255680 A1 | 8/2022 | Moon et al. | |
| 2022/0263605 A1* | 8/2022 | Huang .................. | H04W 72/04 |
| 2022/0303955 A1 | 9/2022 | He et al. | |
| 2022/0345250 A1* | 10/2022 | Bae ........................ | H04L 1/1819 |

FOREIGN PATENT DOCUMENTS

KR     10-2020-0127123 A     11/2020

* cited by examiner

*Primary Examiner* — Mark D Featherstone
*Assistant Examiner* — Victor Perry

(57)     ABSTRACT

A method of a first terminal may comprise: transmitting first SCI to a second terminal and a third terminal; transmitting a first TB to the second terminal and the third terminal based on scheduling by the first SCI; receiving a HARQ feedback including NACK information for the first TB through a first PSFCH resource; determining whether NACK information for at least one terminal among the second terminal and the third terminal has been received, based on the HARQ feedback; and in response to determining that the NACK information has been received, retransmitting the first TB to the at least one terminal.

18 Claims, 14 Drawing Sheets

200

100

14 OFDM symbols (normal CP)

14 OFDM symbols (normal CP)

| 0 | 1 | 2 | 3 | 4 | 5 |
|---|---|---|---|---|---|
| 6 | 7 | 8 | 9 | 10 | 11 |
| 12 | 13 | 14 | 15 | 16 | 17 |
| 18 | 19 | 20 | 21 | 22 | 23 |
| 24 | 25 | 26 | 27 | 28 | 29 |
| 30 | 31 | 32 | 33 | 34 | 35 |

TX UE (zone ID = 8)

RX UE #1 (zone ID = 16)

RX UE #2 (zone ID = 19)

RX UE #3 (zone ID = 28)

METHOD AND APPARATUS FOR CONFIGURING SIDELINK FEEDBACK CHANNEL OF VEHICLE-TO-EVERYTHING TERMINAL IN COMMUNICATION SYSTEM

CROSS-REFERENCE TO RELATED APPLICATIONS

This application claims priority to Korean Patent Applications No. 10-2022-0143474, filed on Nov. 1, 2022, and No. 10-2023-0148195, filed on Oct. 31, 2023, with the Korean Intellectual Property Office (KIPO), the entire contents of which are hereby incorporated by reference.

BACKGROUND

1. Technical Field

Exemplary embodiments of the present disclosure relate to a V2X sidelink transmission technique in a communication system, and more specifically, to a method and an apparatus for configuring a sidelink feedback channel for delivering hybrid automatic repeat request (HARQ) feedback information which is supported for improving reliability of communication between terminals in V2X sidelink transmission.

2. Related Art

Vehicle-to-everything (V2X) communication is a communication technology that supports wireless or wired connections between a vehicle and other vehicles, communication facilities in road infrastructure, or communication devices of pedestrians. The V2X communication includes Vehicle-to-Vehicle (V2V) communication, Vehicle-to-Pedestrian (V2P) communication, and Vehicle-to-Infrastructure entity (V2I) communication, and the like. For instance, a platooning service scenario can be provided in which vehicles forming a group dynamically move and drive through V2V communication, or a vehicle safety or autonomous driving service scenario can be provided in which vehicles exchange information such as speeds, surrounding road environments, and vehicle spacing of the respective vehicles. Additionally, V2I communication can provide high-speed wireless backhaul services to vehicles and support high-speed data transmission to vehicles outside a service coverage through mobile relay.

SUMMARY

Exemplary embodiments of the present disclosure are directed to providing a method and an apparatus for configuring a sidelink feedback channel to reduce waste in resources used for sidelink feedback transmission and sidelink retransmission in a V2X sidelink communication system.

According to a first exemplary embodiment of the present disclosure, a method of a first terminal may comprise: transmitting first sidelink control information (SCI) to a second terminal and a third terminal; transmitting a first transport block (TB) to the second terminal and the third terminal based on scheduling by the first SCI; receiving a hybrid automatic repeat request (HARQ) feedback including negative acknowledgment (NACK) information for the first TB through a first physical sidelink feedback channel (PSFCH) resource; determining whether NACK information for at least one terminal among the second terminal and the third terminal has been received, based on the HARQ feedback; and in response to determining that the NACK information has been received, retransmitting the first TB to the at least one terminal.

The first terminal, the second terminal, and the third terminal may each perform sidelink (SL) communication in a NACK-based groupcast scheme, and the second terminal and the third terminal may be located within a required communication range of the first terminal.

The first PSFCH resource may include at least one of an automatic gain control (AGC) symbol or a PSFCH symbol.

A retransmission target of the first TB may be identified based on distance information of each of the second terminal and the third terminal with respect to the first terminal.

A retransmission target of the first TB may be identified based on direction information of each of the second terminal and the third terminal with respect to the first terminal.

A plurality of preconfigure direction information may be determined based on a resolution or a number beams in beamforming of the first terminal.

The retransmitting of the first TB may comprise: transmitting second SCI to the at least one terminal; and retransmitting the first TB to the at least one terminal based on scheduling by the second SCI.

According to a second exemplary embodiment of the present disclosure, a method for a second terminal may comprise: receiving first sidelink control information (SCI) from a first terminal; receiving a first transport block (TB) from the first terminal based on scheduling by the first SCI; determining whether to transmit negative acknowledgment (NACK) information for the first TB; in response to determining to transmit the NACK information, transmitting, to the first terminal, a hybrid automatic repeat request (HARQ) feedback including the NACK information through a first physical sidelink feedback channel (PSFCH) resource based on location information; and receiving the first TB retransmitted from the first terminal.

Sidelink (SL) communication between the first terminal and the second terminal may be indicated by the first SCI to be perform in a NACK-based groupcast scheme, the second terminal may be located within a required communication range of the first terminal, and the required communication range may be indicated by the first SCI.

The first PSFCH resource may include at least one of an automatic gain control (AGC) symbol or a PSFCH symbol.

The location information may include at least one of distance information between the first terminal and the second terminal or direction information between the first terminal and the second terminal, and the distance information and the difference information may be determined based on location information of the first terminal and location information of the second terminal, and the location information of the first terminal may be included in the first SCI.

The distance information may be one of a plurality of preconfigured distance information and the direction information may be one of a plurality of preconfigured direction information.

The plurality of preconfigured direction information may be determined based on a resolution or a number beams in beamforming of the first terminal.

The receiving of the retransmitted first TB may comprise: receiving second SCI from the second terminal; and receiving the retransmitted first TB based on scheduling by the second SCI.

According to a third exemplary embodiment of the present disclosure, a first terminal may comprise at least one processor, and the at least one processor causes the first terminal to perform: transmitting first sidelink control information (SCI) to a second terminal and a third terminal; transmitting a first transport block (TB) to the second terminal and the third terminal based on scheduling by the first SCI; receiving a hybrid automatic repeat request (HARQ) feedback including negative acknowledgment (NACK) information for the first TB through a first physical sidelink feedback channel (PSFCH) resource; determining whether NACK information for at least one terminal among the second terminal and the third terminal has been received, based on the HARQ feedback; and in response to determining that the NACK information has been received, retransmitting the first TB to the at least one terminal.

The first terminal, the second terminal, and the third terminal may each perform sidelink (SL) communication in a NACK-based groupcast scheme, and the second terminal and the third terminal may be located within a required communication range of the first terminal.

The first PSFCH resource may include at least one of an automatic gain control (AGC) symbol or a PSFCH symbol.

A retransmission target of the first TB may be identified based on distance information of each of the second terminal and the third terminal with respect to the first terminal.

A retransmission target of the first TB may be identified based on direction information of each of the second terminal and the third terminal with respect to the first terminal.

A plurality of preconfigure direction information may be determined based on a resolution or a number beams in beamforming of the first terminal.

According to exemplary embodiments of the present disclosure, in V2X sidelink communication, a zone ID of a receiving terminal can be shared in a process of delivering HARQ feedback. In a NACK-only feedback scheme, consumption of resources used for retransmission of a transport block (TB) can be reduced. In addition, when 2-stage SCI is used, a zone ID of a transmitting terminal can be added to second-stage SCI, and a physical sidelink feedback channel (PSFCH) symbol resource previously used for automatic gain control (AGC) can be efficiently utilized. The increase number of PSFCH symbols can shorten a delay time of HARQ ACK/NACK feedback transmission according to the configurations of the present disclosure, which are supported together. Accordingly, HARQ feedback between V2X terminals can be performed quickly, and the reliability of HARQ ACK/NACK feedback can be improved. In addition, a minimum delay time required for HARQ ACK/NACK transmission can be shortened.

BRIEF DESCRIPTION OF DRAWINGS

FIG. 8 is a conceptual diagram illustrating an exemplary embodiment of NACK feedback transmission in NR V2X communication according to an exemplary embodiment of the present disclosure.

FIG. 9 is a conceptual diagram illustrating an exemplary embodiment of configuration of TX-RX UEs and zone IDs thereof, according to an exemplary embodiment of the present disclosure.

DETAILED DESCRIPTION OF THE EMBODIMENTS

Figure 1:
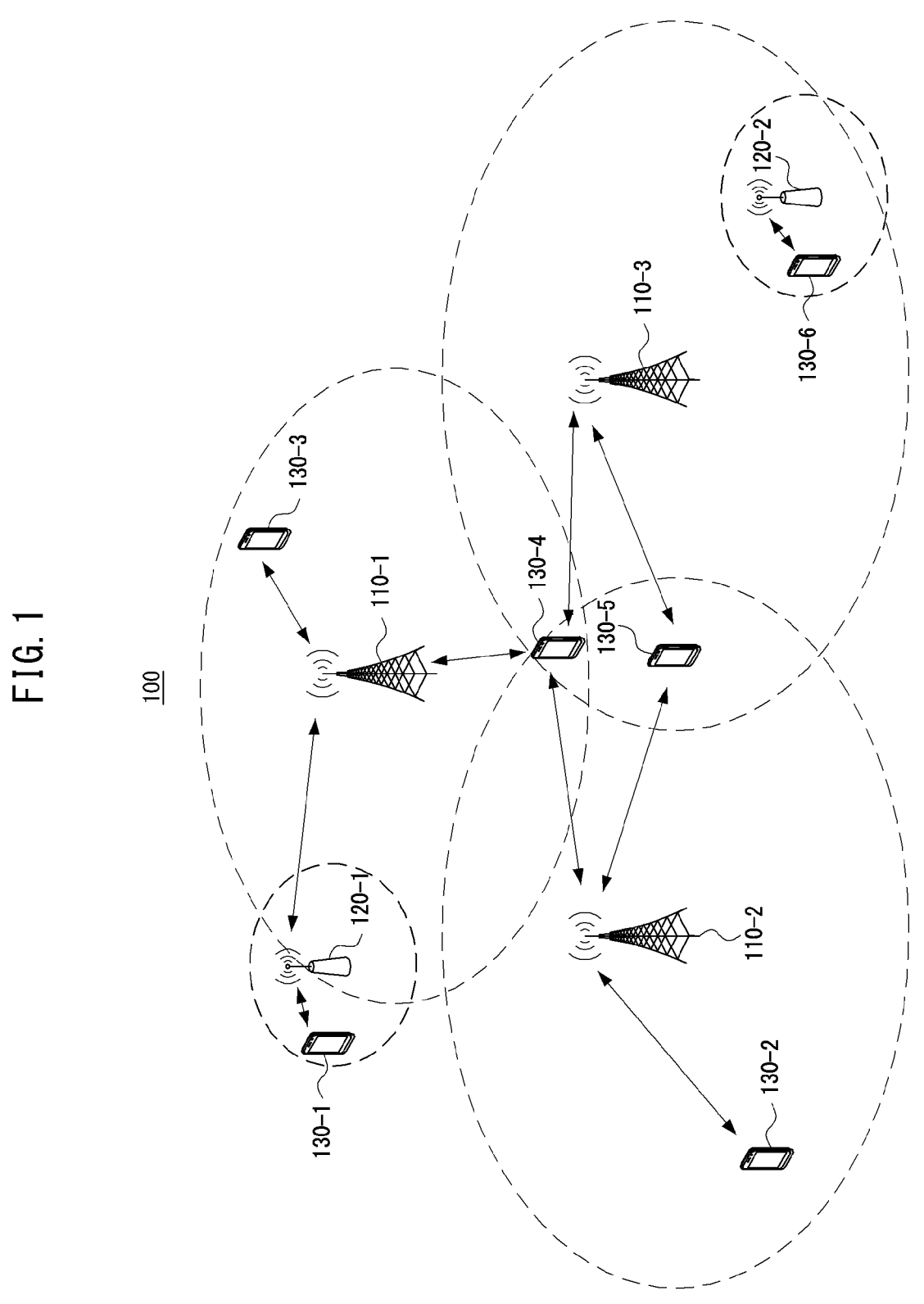
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and redundant descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
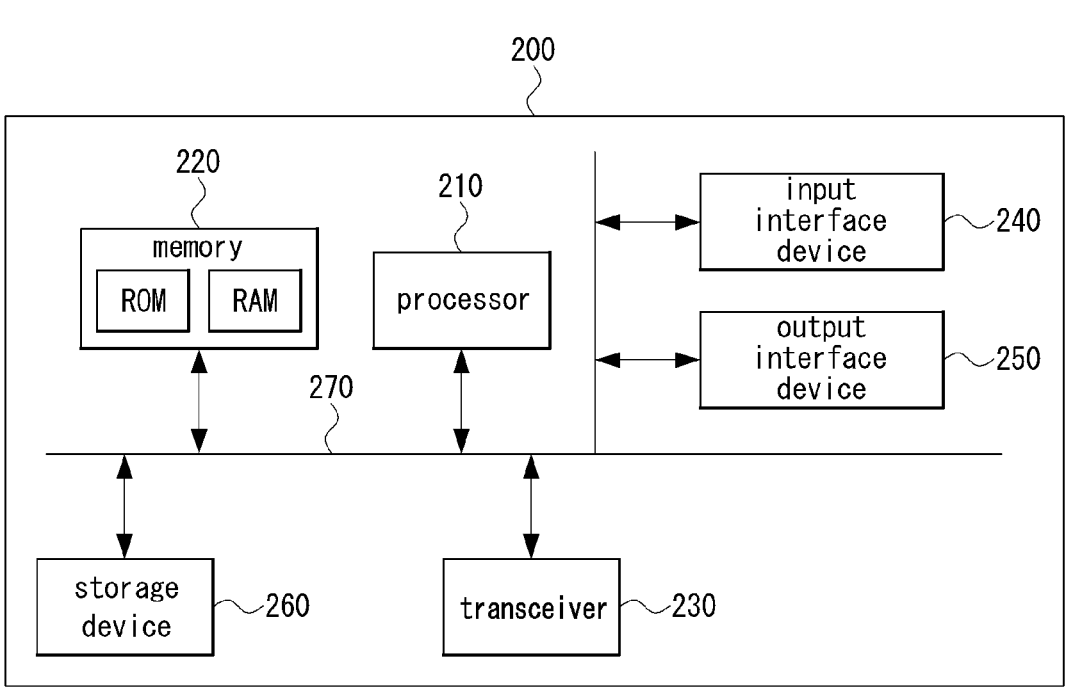
FIG. 2 is a block diagram illustrating a first exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods and apparatuses for configuring a sidelink feedback channel will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Figure 3A:
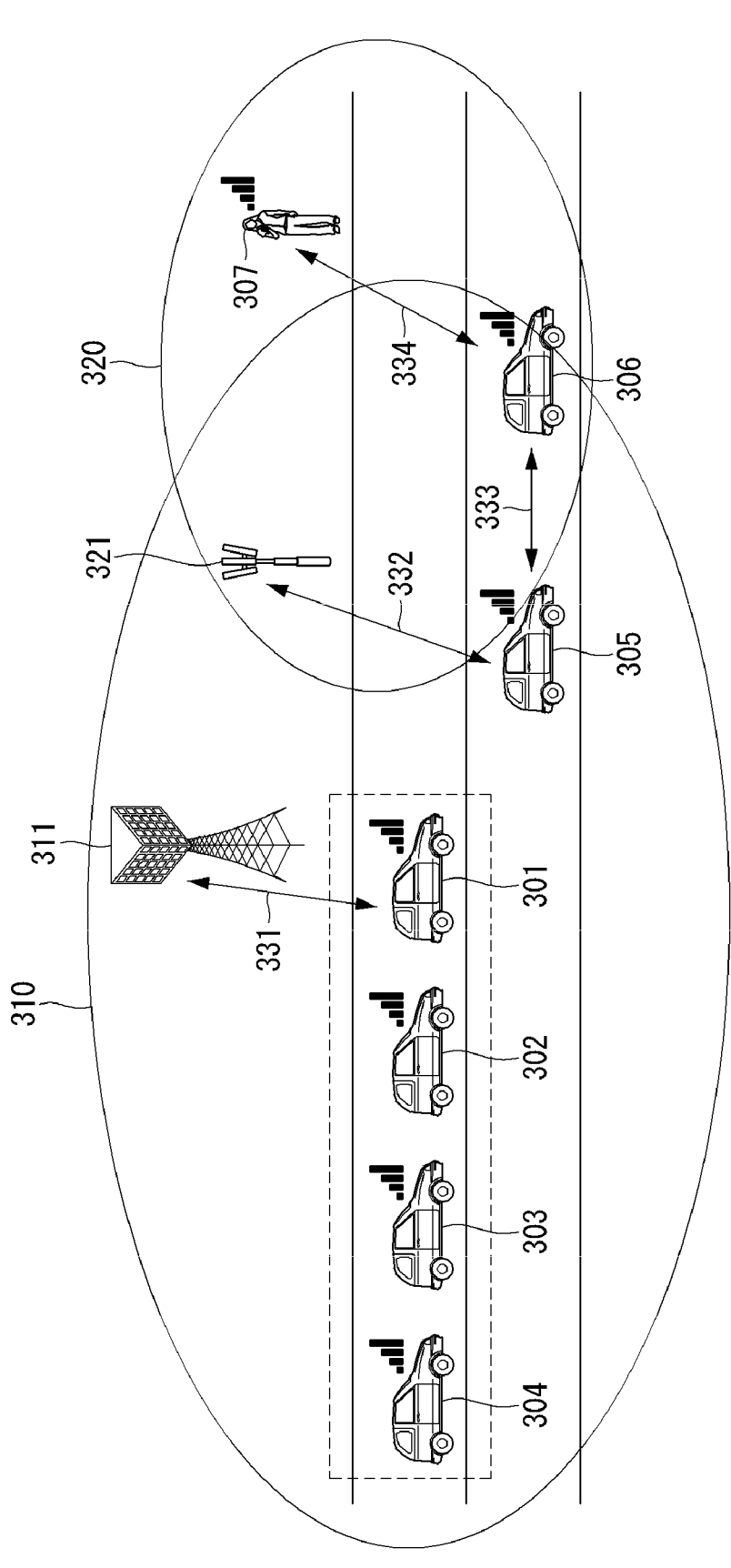
FIG. 3A is a conceptual diagram illustrating types of sidelink communication according to the present disclosure.

FIG. 3A is a conceptual diagram illustrating types of sidelink communication according to the present disclosure.

Referring to FIG. 3A, a base station (BS) 311 may have a base station coverage 310. A plurality of vehicle terminals 301, 302, 303, 304, 305, and 306 may be located within the base station coverage 310. In addition, a road side unit (RSU) 321 may have an RSU coverage 320 based on a sidelink communication scheme. A plurality of terminals 305, 306, and 307 may be located within the RSU coverage 320. FIG. 3A illustrates a user who possesses the terminal 307 capable of sidelink communication with the vehicle terminals 301, 302, 303, 304, 305, and 306 driving on a road. The vehicle terminal may be a terminal mounted on a vehicle (or attached to a vehicle, or carried or worn by a driver or passenger of a vehicle). For convenience of description, these vehicle terminals 301 to 306 will be referred to as vehicles. In addition, for convenience of description, a pedestrian who possess (or carry or wear) the terminal 307 capable of sidelink communication will be referred to as a pedestrian or user. In addition, since FIG. 3A is a diagram for describing sidelink communication according to the present disclosure, only parts related to sidelink communication will be described. Hereinafter, various sidelink communications will be described.

Communication between the base station 311 and the vehicle 301 may be referred to as Vehicle-to-Network (V2N) communication 331. The V2N communication 331 may consist of downlink (DL) from the base station 311 to the vehicle 301 and uplink (UL) from the vehicle 301 to the base station 311.

Communication between the RSU 321 and the vehicle 305 may be referred to as Vehicle-to-Infrastructure (V2I) communication 332. The V2I communication 332 may consist of DL, UL, and/or sidelink (SL).

Communication between the vehicle 305 and the vehicle 306 may be referred to as Vehicle-to-Vehicle (V2V) communication 333. The V2V communication 333 is performed in a scheme of performing direct communication between the vehicles, and various data may be transmitted and received between the vehicles without control of a base station or RSU.

Communication between the vehicle 306 and the pedestrian 307 may be referred to as Vehicle-to-Pedestrian (V2P) communication 334. The V2P communication between the vehicle 306 and the pedestrian 307 may refer to communication between a high-speed moving entity and a low-speed moving entity walking. In addition, the V2P communication 334 may include communication between pedestrians or communication between users riding low-speed vehicles such as cars and bicycles.

Figure 3B:
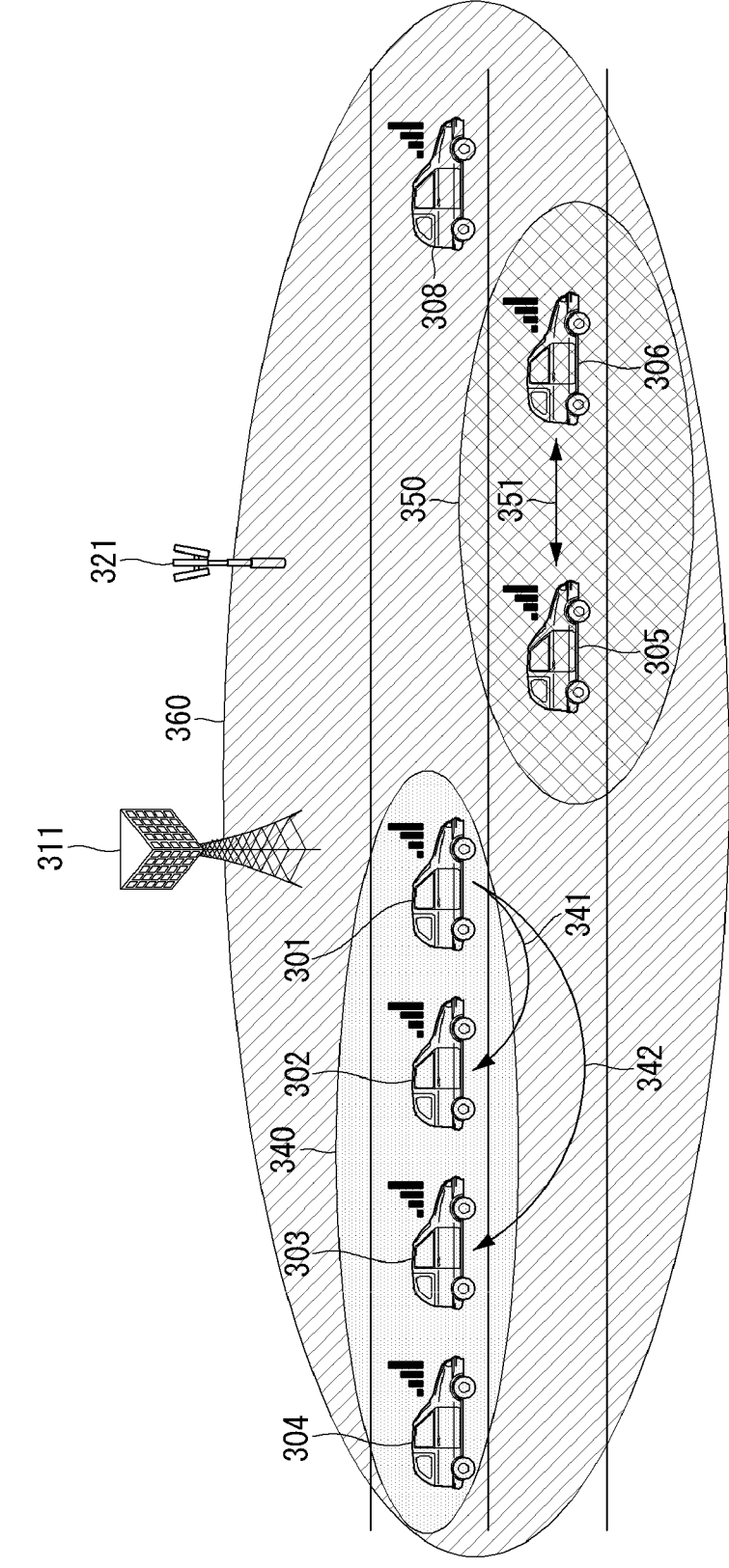
FIG. 3B is a conceptual diagram illustrating broadcast-based, groupcast-based, and unicast-based sidelink communications provided by NR V2X.

FIG. 3B is a conceptual diagram illustrating broadcast-based, groupcast-based, and unicast-based sidelink communications provided by NR V2X.

Comparing FIG. 3B with FIG. 3A, a new vehicle 308 is illustrated instead of the user 307, the coverage of the base station 311 is not illustrated, and the coverage of the RSU 321 is not illustrated. All other components have the same form.

A broadcast communication region 360 for broadcast-based sidelink communication mainly provided by LTE V2X may be a region where beacon frames are transmitted by a specific communication device. In addition, NR V2X has introduced unicast-based and groupcast-based sidelink communications to support a wider variety of V2X services in addition to the broadcast-based sidelink communication.

FIG. 3B exemplifies a groupcast communication region 340 of a group to which the vehicles 301, 302, 303, and 304 belong, and a unicast communication region 350 for unicast communication between the vehicle terminals 305 and 306.

A case where the vehicle 301 transmits data (i.e., 341 and 342) to other vehicles 302 and 303 in the groupcast scheme within the groupcast communication region 340 may be considered. In particular, the form illustrated in FIG. 3B may be a form of vehicle platooning. In the case of vehicle platooning, the leading vehicle 301 in a group of vehicles moving together may adjust distances between vehicles by transmitting sidelink messages to the other vehicles 302 and 303. In FIG. 3B, a case where the vehicle 301, which is a terminal within the group, transmits data to the vehicles 302 and 303 within the groupcast communication region 340 is illustrated, but a terminal outside the group may transmit data to the vehicles 301 to 304 within the group through groupcast communication.

In addition, in the case of unicast communication, the vehicles 305 and 306 may exist within the unicast communication region 350 and may communicate with each other. Accordingly, in the NR V2X system, messages may be transmitted and received directly between the vehicles 305 and 306, that is, between the terminals, through unicast communication.

As described above, the V2X communication may be a communication technology that supports wired/wireless connections between vehicles and other vehicles, communication facilities in road infrastructure, or communication devices of pedestrian. The V2X communication may include V2V communication, V2P communication, V2I communication, and the like.

In an exemplary embodiment, a platooning service scenario can be provided in which vehicles forming a group dynamically move and drive through V2V communication, or a vehicle safety or autonomous driving service scenario can be provided in which vehicles exchange information such as speeds, surrounding road environments, and vehicle spacing of the respective vehicles. Additionally, V2I communication can provide high-speed wireless backhaul services to vehicles and support high-speed data transmission to vehicles outside a service coverage through mobile relay.

In the communication system (e.g., LTE or NR system), a link formed between terminals for direct communication between the terminals may be referred to as a sidelink (SL) for distinguishment from uplink and downlink. A transmitting terminal (TX UE) may directly transmit data to a receiving terminal (RX UE) through a sidelink without going through a base station. Sidelink transmission may include broadcast, groupcast (or multicast), and unicast transmissions. In the case of broadcast and groupcast, a transmitting terminal may transmit the same data to a plurality of receiving terminals by using the same signal. The direct communication between terminals may also be referred to as sidelink communication, sidelink transmission, device-to-device (D2D) communication, or the like.

In the $3^{rd}$ generation partnership project (3GPP), NR V2X standardization has been initiated to support V2X communication service scenarios. While incorporating LTE V2X specifications, NR V2X specifications have been designed with higher requirements than LTE V2X, and the NR SL specifications have been introduced in the 3GPP release 16. Here, a SL refers to a communication link on which, as mentioned above, devices directly exchange voice or data without traversing a network (such as a base station (gNB)).

In order to support communication between vehicles, between a vehicle and another device, and between a vehicle and an infrastructure network device, the NR SL specifications provide methods of designing and configuring, methods of transmitting and receiving, methods of configuring and signaling higher layer parameters, and transmission protocols for NR numerology-based physical layer synchronization channel, data channels, control channels, feedback channel, and the like. Further, unlike LTE V2X, which only supports broadcast transmission, the NR V2X sidelink may support unicast and groupcast transmission schemes.

Referring to FIGS. 3A and 3B, the communication system may include the base station, terminal, vehicle terminals, and the like. The vehicle located outside the coverage of the base station may expand its service range through V2V communication with the vehicle within the coverage of the base station. In addition, a plurality of vehicles may form a group and exchange data/control information, etc. through groupcast communication.

As described above, V2X terminals such as vehicles or various terminals may be located within a coverage of a base station (e.g., gNB) or may be located outside a coverage of a base station.

The terminals (e.g., vehicle terminals) located within a coverage of a base station may perform sidelink communication therebetween. Also, a terminal located within a coverage of a base station may perform sidelink communication with a terminal located outside a coverage of a base station. Accordingly, in order to support such various scenarios, wireless transmission and access techniques may be required to allocate radio resources for sidelink transmission and ensure reliability of a communication link.

The NR sidelink may apply a radio frame structure and OFDM numerologies used in the 5G NR UL and DL transmission. Like an NR UL/DL transmission frame, a sidelink radio frame may have a length of 10 ms and may be divided into two 5 ms half frames. In addition, one half-frame may include 5 1 ms subframes.

One subframe may be divided into one or multiple slots, and the number of slots transmitted within one subframe may be determined as the length of one slot is determined according to a subcarrier spacing (SCS). Each slot may consist of 12 or 14 OFDM(A) symbols depending on a cyclic prefix (CP) type. In addition, $\mu=0,1,2,3$, and 4 indicating the OFDM numerologies may be mapped to SCSs of 15, 30, 60, 120, and 240 kHz, respectively. For example, in a V2X terminal designed based on the OFDM numerology $\mu=3$, a transmission frame may have a 120 kHz SCS, one slot may have a length of 125 us, one subframe may have 8 slots, and one frame may have 80 slots.

For NR UL/DL, a data transmission or resource allocation unit may be a resource block (RB), and one RB may include 12 subcarriers. In NR sidelink communication, a resource allocation unit may be a subchannel. Meanwhile, the physical channels and physical signals used in sidelink communication may be defined as Table 1 below.

TABLE 1

| | Name |
|---|---|
| Physical channels | Physical sidelink broadcast channel (PSBCH) |
| | Physical sidelink shared channel (PSSCH) |
| | Physical sidelink control channel (PSCCH) |
| | Physical sidelink feedback channel (PSFCH) |
| | Physical sidelink discovery channel (PSDCH) |
| Physical signals | Sidelink primary synchronization signal (S-PSS) |
| | Sidelink secondary synchronization signal (S-SSS) |
| | Demodulation reference signal (DM-RS) |
| | Sidelink channel state information reference signal (SL-CSI-RS) |
| | Sidelink phase tracking reference signal (SL-PT-RS) |

According to Table 1, the physical channels for sidelink communication may include a physical sidelink broadcast channel (PSBCH), a physical sidelink shared channel (PSSCH), and a physical sidelink control channel (PSCCH), a physical sidelink discovery channel (PSDCH), and the like. The PSSCH may be used for transmission and reception of sidelink data and may be configured to a terminal by higher layer signaling. The PSCCH may be used for transmission and reception of sidelink control information (SCI) and may be configured to a terminal by higher layer signaling. The PSFCH may deliver feedback related to successful or failed reception of sidelink transmission. The PSDCH may be used for discovery procedures. For example, a terminal may transmit a discovery signal through the PSDCH for a discovery procedure with other terminals. The PSBCH may be used for transmission and reception of broadcast information (e.g., system information). The system information may include information indicating a frame number (e.g., system frame number (SFN)), information indicating a system bandwidth, UL-DL subframe configuration information, and the like.

Further, DM-RS, synchronization signals, and the like may be used in sidelink communication. The DM-RS may be used for channel estimation in sidelink communication. The synchronization signals may be used for link synchronization in sidelink communication and may include a sidelink primary synchronization signal (S-PSS) and a sidelink secondary synchronization signal (S-SSS). The S-PSS and S-SSS may be transmitted as being included in one sidelink synchronization signal block (S-SSB). The sidelink channel state information reference signal (SL CSI-RS) may be a reference signal transmitted by a transmitting terminal to receive sidelink channel state information (SL-CSI). The SL CSI-RS may be transmitted within a PSSCH region of a slot. The sidelink phase tracking reference signal (SL PT-RS) may be used to mitigate the effects of phase noises (especially at higher frequencies) caused by oscillator imperfections. The SL PT-RS may be transmitted within a PSSCH region of a slot.

Figure 4:
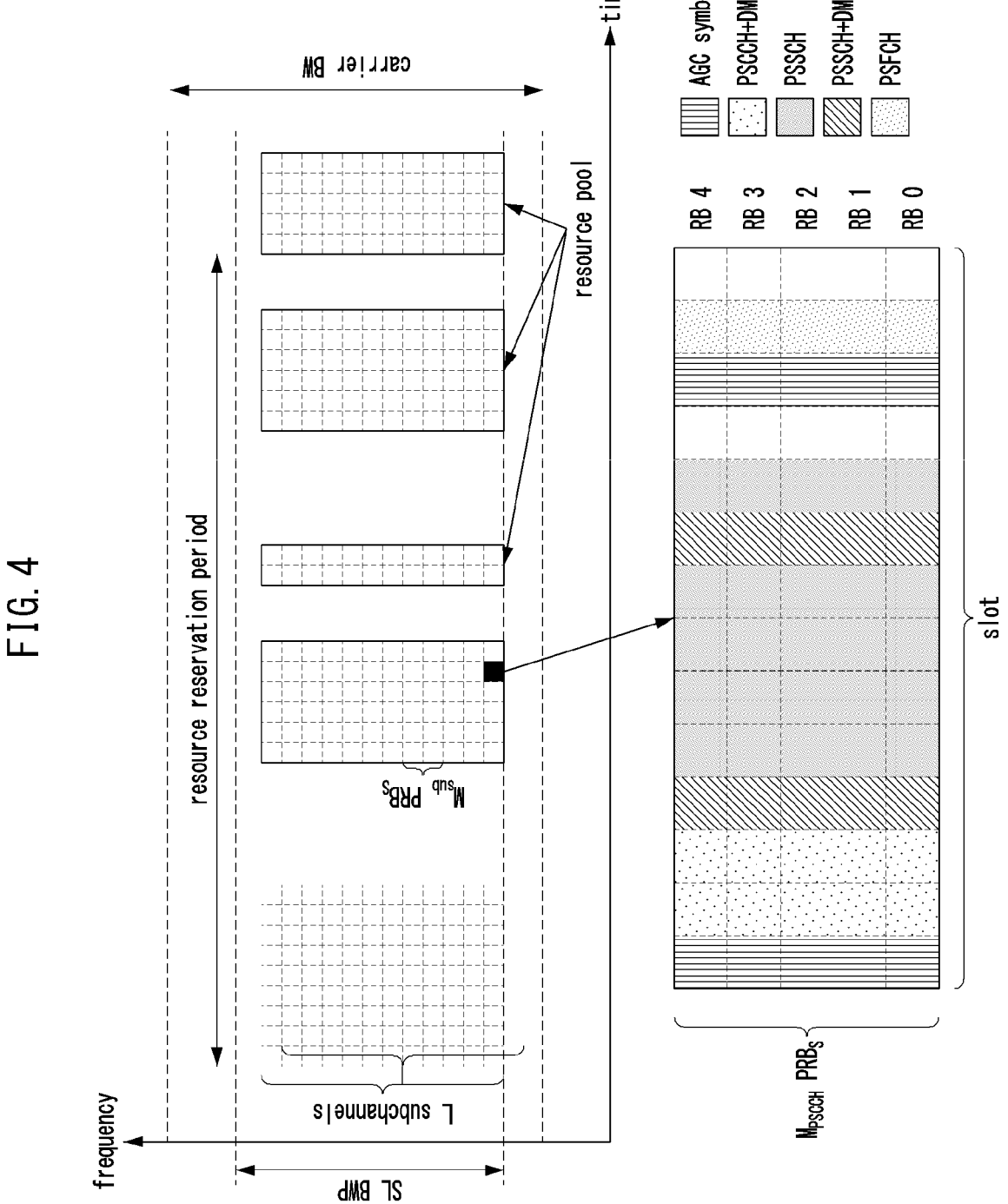
FIG. 4 is a conceptual diagram illustrating a sidelink resource pool according to an exemplary embodiment of the present disclosure.

FIG. 4 is a conceptual diagram illustrating a sidelink resource pool according to an exemplary embodiment of the present disclosure.

Referring to FIG. 4, a sidelink resource pool may correspond to a subset of available sidelink resources. As shown in FIG. 4, sidelink resources may be configured in units of allocated slots and subchannels within a bandwidth part (BWP). A subset of sidelink resources available in sidelink communication may be preconfigured so that a plurality of terminals use it for sidelink transmission. A subchannel may be comprised of one or more RBs, and an RB comprised within one transmission resource may be defined as a physical resource block (PRB). The resource pool may consist of contiguous PRBs and contiguous or non-contiguous slots. In sidelink communication, a subchannel size L may be set as L ∈{10, 12, 15, 25, 50, 75, 100}. Here, sidelink communication may refer to NR V2X sidelink communication.

In sidelink communication, one subchannel may be composed of multiple PRBs as shown in FIG. 4. The RBs may be configured with PSCCH/PSSCH/DMRS, PSSCH/DMRS/PSFCH, PSSCH/DMRS/SL CSI-RS, or PSSCH/DMRS/SL PT-RS depending on a purpose of transmission.

Figure 5:
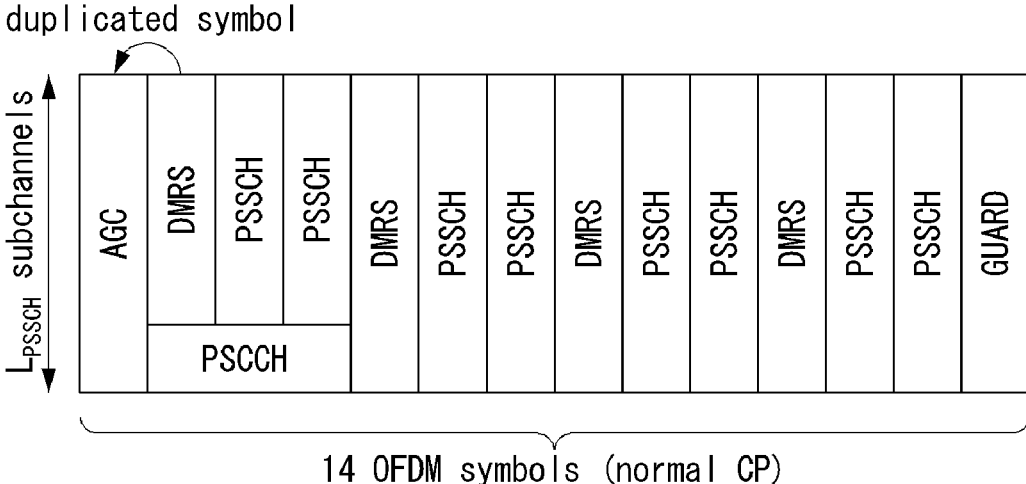
FIG. 5 is a conceptual diagram illustrating a first exemplary embodiment of a slot configuration in sidelink communication according to an exemplary embodiment of the present disclosure.

FIG. 5 is a conceptual diagram illustrating a first exemplary embodiment of a slot configuration in sidelink communication according to an exemplary embodiment of the present disclosure.

Referring to FIG. 5, in sidelink communication, a slot may consist of 14 symbols in case of a normal CP and may include PSCCH, PSSCH, automatic gain control (AGC), and guard symbols. The first symbol may be used as the AGC symbol, and the last symbol may be used as the guard symbol. The AGC symbol may a symbol for sidelink AGC operations, and may be a symbol obtained by duplicating the second symbol. The PSCCH may include three OFDM symbols, starting from the second OFDM symbol. The DMRS may be assigned to the 2/5/8/11th OFDM symbols.

Figure 6:
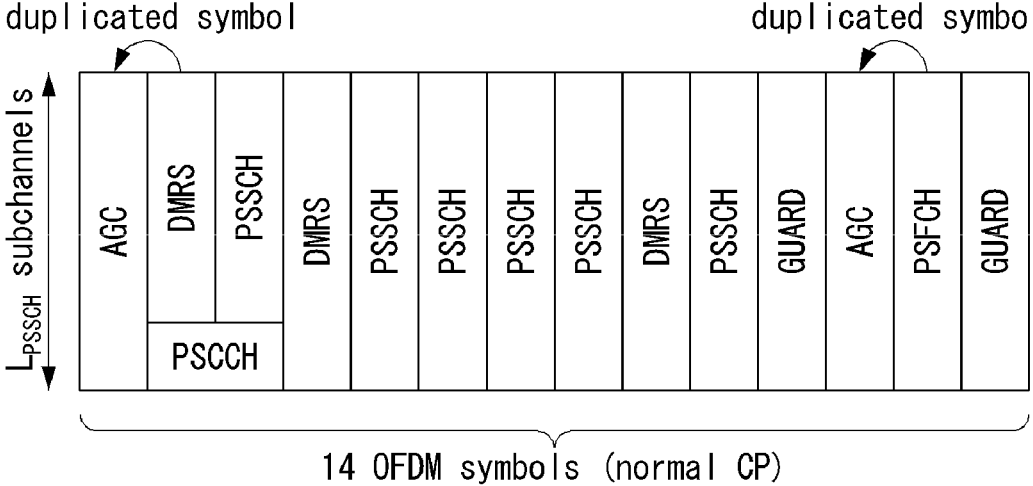
FIG. 6 is a conceptual diagram illustrating a second exemplary embodiment of a slot configuration in sidelink communication according to an exemplary embodiment of the present disclosure.

FIG. 6 is a conceptual diagram illustrating a second exemplary embodiment of a slot configuration in sidelink communication according to an exemplary embodiment of the present disclosure.

Referring to FIG. 6, in sidelink communication, a slot may consist of 14 symbols in case of a normal CP. The first symbol may be used as the AGC symbol, and may be a symbol obtained by duplicating the second symbol as a symbol for sidelink AGC operations. The AGC symbol before the PSFCH symbol may be configured as a duplicated symbol of the PSFCH symbol. The symbol after the PSFCH symbol may be used as a guard symbol. Meanwhile, in the case of a slot including a PSFCH, there may be a maximum of 9 symbols used for PSCCH and PSSCH transmission, excluding AGC and guard symbols.

Meanwhile, the important feature of sidelink communication (e.g., NR V2X sidelink communication) may be that it supports two-stage SCI. In two-stage SCI, the first stage SCI (i.e., $1^{st}$-stage SCI or SCI1) may be transmitted through a separate channel (i.e., PSCCH) in a PSCCH region. On the other hand, the second-stage SCI (i.e., $2^{nd}$-stage SCI of SCI2) may be transmitted in a PSSCH region along with a transport block (TB) consisting of a data payload. The SCI1 may include information required for channel sensing of reserved resources, and the SCI2 may include control information required for data demodulation for each terminal. In addition, the SCI2 may include information for HARQ feedback in unicast and groupcast communication. A receiving terminal may transmit a HARQ feedback through a PSFCH in response to a unicast or groupcast transmission in a slot configured with a PSSCH and the PSFCH. Through the two-stage SCI transmission, SL terminals may reduce the complexity of resource sensing and resource reservation by demodulating only the SCI1.

<NR V2X SL HARQ Feedback>

The NR V2X communication (e.g., sidelink communication) may support feedback in unicast and groupcast communication to increase the reliability of sidelink transmission. The PSFCH may consist only of HARQ feedback data (e.g., ACK or NACK) transmitted from receiving terminal(s) to a transmitting terminal. A slot including PSFCH(s) within a resource pool may be (pre)configured to be transmitted at a periodicity of 1, 2, or 4 slots. The PSFCH may be transmitted in one of the symbols of PSCCH/PSSCH slots, as shown in FIG. 6. One AGC symbol may be configured before a PSFCH symbol by duplicating the PSFCH symbol, and a symbol after the PSFCH symbol may configured as a guard (GD) symbol. Such a PSFCH symbol set (i.e., AGC, PSFCH, GD) may be transmitted at the end of a PSSCH slot along with PSSCH symbols. In the case of a slot including a PSFCH, there may be a maximum of 9 symbols used for PSCCH and PSSCH transmission, excluding AGC and guard symbols.

As described above, a receiving terminal may transmit a HARQ feedback through a PSFCH in response to unicast or groupcast transmission delivered on a PSSCH. In addition, information on the HARQ feedback may be transmitted through SCI2. The SCI2 may support three SCI formats (i.e., SCI Format 2-A, SCI Format 2-B, and SCI Format 2-C). The SCI format 2-A may be used to support 'no HARQ feedback', 'unicast HARQ feedback', or 'groupcast HARQ feedback (option 1 or option 2)'. In addition, the SCI format 2-A may include an indicator for a cast scheme. The SCI format 2-B may be used when there is no HARQ feedback or when the groupcast HARQ feedback option 1 is supported. The SCI format 2-B may include a zone ID and may indicate a required communication range of the transmitting terminal. Since the zone ID has a 12-bit value, a given area may be divided into $2^{12}$ zones of equal size. The zone ID of the transmitting terminal may indicate a zone in which the transmitting terminal is located and may inform the location of the transmitting terminal. On the other hand, the SCI format 2-C may be used only in unicast communication, and may be used to provide inter-UE coordination information or request inter-UE coordination information.

As an SL HARQ feedback for unicast transmission, a receiving terminal may transmit ACK information when the receiving terminal successfully decodes a TB included in a PSSCH. On the other hand, if the TB is not decoded after the first-stage SCI (SCI1) is decoded, NACK may be transmitted as the SL HARQ feedback for unicast transmission. Here, the SL HARQ feedback may be transmitted through a PSFCH resource.

In groupcast communication, the SL HARQ feedback option 1 may be selected when HARQ feedback is transmitted only from a receiving terminal within a specified distance (i.e., required communication range) from the transmitting terminal. The receiving terminal may transmit NACK information to the transmitting terminal only when it fails to decode the PSSCH received from the transmitting terminal. In the SL HARQ feedback option 2 for groupcast communication, all receiving terminals may transmit HARQ feedback. If a receiving terminal succeeds in decoding the PSSCH transmitted from the transmitting terminal, the receiving terminal may transmit ACK information to the transmitting terminal as HARQ feedback. On the other hand, if the receiving terminal fails to decode the PSSSCH transmitted from the transmitting terminal, the receiving terminal may transmit NACK information to the transmitting terminal as HARQ feedback.

Figure 7:
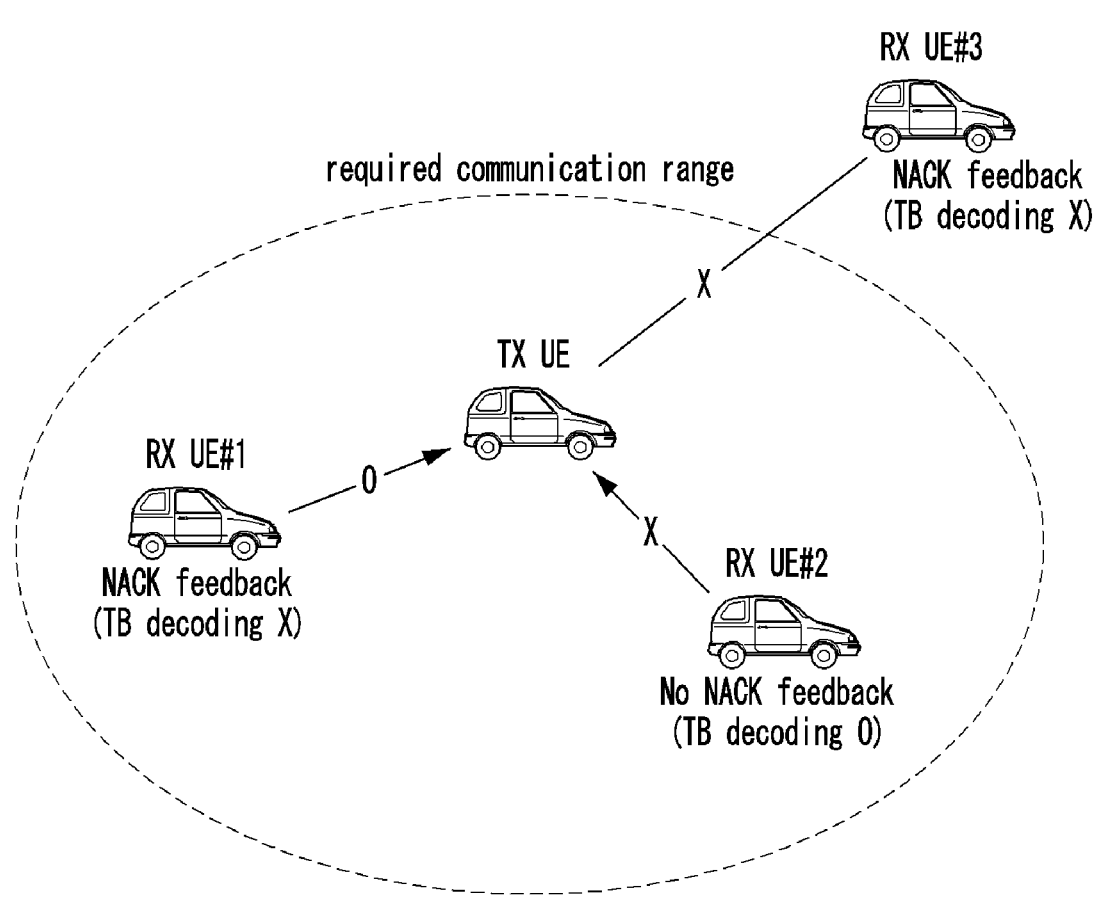
FIG. 7 is a conceptual diagram illustrating an exemplary embodiment of NACK feedback transmission in groupcast sidelink communication according to an exemplary embodiment of the present disclosure.

FIG. 7 is a conceptual diagram illustrating an exemplary embodiment of NACK feedback transmission in groupcast sidelink communication according to an exemplary embodiment of the present disclosure.

Referring to FIG. 7, sidelink communication (e.g., NR V2X sidelink communication) may include one transmitting terminal and multiple receiving terminals (i.e., RX UE #1, RX UE #2, RX UE #3). The RX UE #1 and RX UE #2 may be located within a required communication range of the transmitting terminal, and the RX UE #3 may be located outside the required communication range. The transmitting terminal may transmit a data channel (e.g., PSSCH) to each of a plurality of receiving terminals (i.e., RX UE #1, RX UE #2, and RX UE #3) using a groupcast scheme. Each of the plurality of receiving terminals (i.e., RX UE #1, RX UE #2, RX UE #3) may operate in the SL HARQ feedback option 1.

After performing decoding of first-stage SCI, the RX UE #1 may not successfully decode a TB. In addition, a relative distance (i.e., Tx-Rx distance) between the RX UE #1 and the TX UE may be less than or equal to the required communication range, and the RX UE #1 may transmit NACK information to the TX UE.

The RX UE #2 may successfully decode the TB, and a relative distance (i.e., Tx-Rx distance) between the RX UE #2 and the TX UE may be less than or equal to the required communication range. The RX UE #2 may not transmit HARQ feedback to the TX UE.

On the other hand, a relative distance (i.e., Tx-Rx distance) between the RX UE #3 and the TX UE may be larger than the required communication range, and the RX UE #3 may not successfully decode the TB. The RX UE #3 may not transmit HARQ feedback to the TX UE.

In FIG. 7, the scenario in which NACK is not transmitted as HARQ feedback may correspond to a case (e.g., case of RX UE #2) when the RX UE has successfully decoded the TB or a case (e.g., case of RX UE #3) when the RX UE is outside the minimum required communication range (and when it has not successfully decoded the TB).

Meanwhile, in the case of groupcast feedback option 2, all RX UEs in the group may support HARQ ACK/NACK feedback. If an RX UE supporting the groupcast feedback option 2 successfully decodes a TB after decoding SCI1, the RX UE may transmit ACK information to a TX UE as HARQ feedback. If an RX UE dose not successfully decode a TB after decoding SCI1, the RX UE may transmit NACK information to the TX UE as HARQ feedback.

The present disclosure relates to sidelink feedback channel configuration in NR V2X communication (e.g., sidelink communication). In the present disclosure, a TX UE and an RX UE will be described as an example based on a sidelink, but the present disclosure is not limited to the sidelink, and may be applied a wireless communication system capable of applying HARQ feedback transmission through a feedback channel.

As described above, the NR V2X communication may support feedback on a TB transmitted in a PSSCH slot in unicast and groupcast communication to increase the reliability of SL transmission. The groupcast feedback option 1 is a NACK-only feedback scheme, and may be related to a method for the RX UE to share NACK for a resource in which a TB has not be received within the required communication range. In the groupcast feedback option 1, the TX UE may only receive NACK as a response to the transmitted resource (e.g., PSSCH resource), and the RX UE that transmitted the NACK may not be identified. Therefore, for the groupcast feedback option 1, when the TX UE receives at least one NACK, it may recognize that at least one RX UE has failed TB decoding within the required communication range. The TX UE may retransmit the resource (e.g., PSCCH) for which decoding failed to at least one RX UE within the required communication range.

Hereinafter, a feedback channel configuration method proposed in the present disclosure will be described. The feedback channel configuration method proposed in the present disclosure will be described based on FIG. 8.

Figure 8:
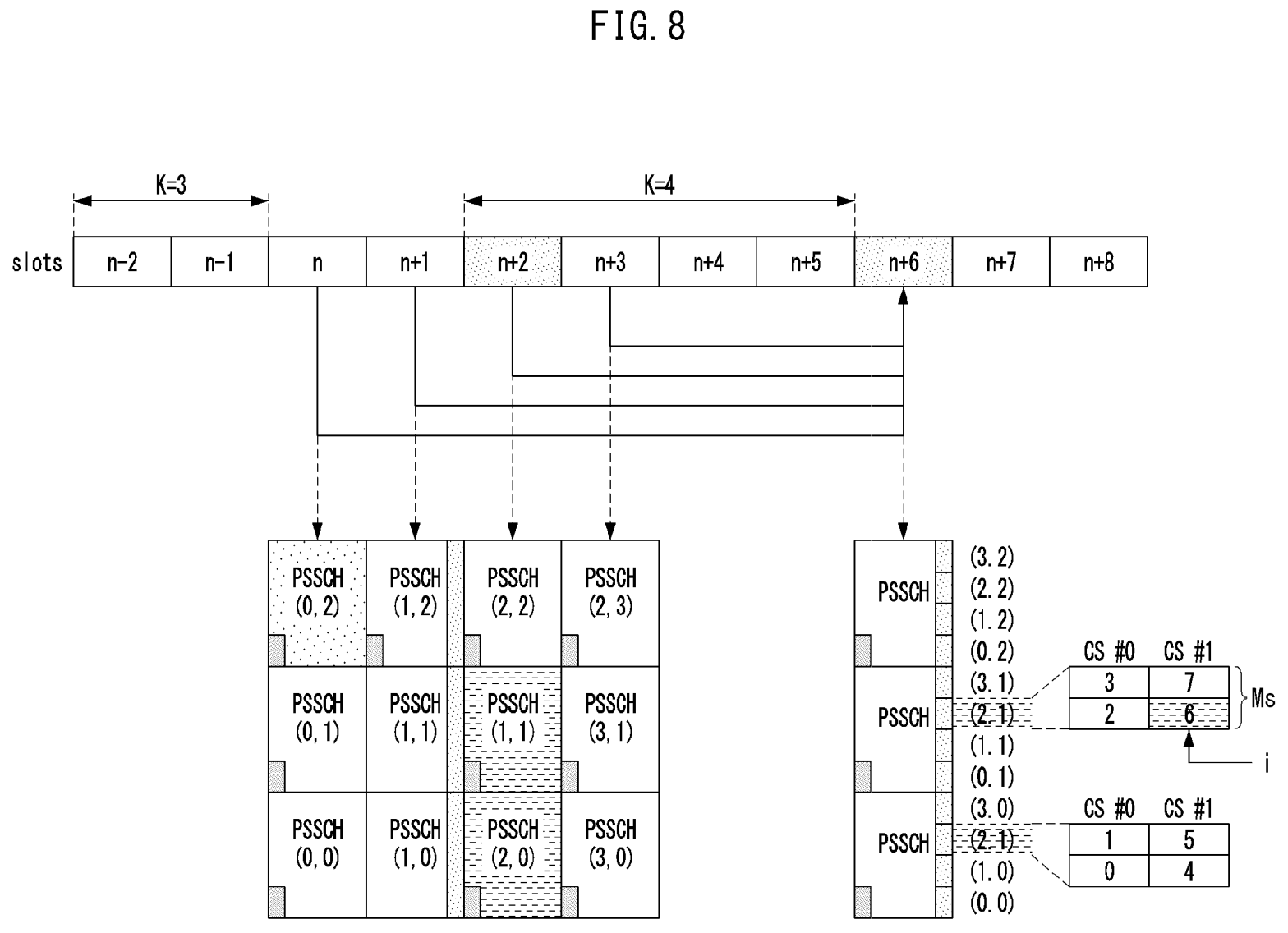

FIG. 8 is a conceptual diagram illustrating an exemplary embodiment of NACK feedback transmission in NR V2X communication according to an exemplary embodiment of the present disclosure.

Referring to FIG. 8, a PSFCH may be transmitted in a PSSCH slot at a periodicity of N slots. For example, when the periodicity N is 4, the number L of subchannels is 3, and the minimum number K of slots required for processing feedback transmission for the n-th PSSCH slot is 2, a PSFCH to be transmitted in the (n+6)-th slot may include 1 bit of ACK/NACK information for PSSCHs of the slots n, n+1, n+2, and n+3. Therefore, the PSFCH may be mapped to one PSSCH resource in the order of (k, l), and the number $M_s$ of PRBs through which feedback (e.g., ACK/NACK information) can be transmitted in one PSSCH resource may be configured as $M_s=M/L \cdot K$. Here, M may be a size of subchannels of a resource reserved through SCI1. ACK/NACK information for the (k, l)-th PSSCH resource may be configured by the following procedure.

1) A transmission resource type may be set to one of {startSubCH, allocSubCH} for the size $L_{PSSCH}$ of subchannels through which the PSSCH is actually transmitted. startSubCH may be a scheme of transmitting ACK/NACK in a region mapped to a start resource for consecutive $L_{PSSCH}$. allocSubCH may be a scheme of transmitting ACK/NACK in a region mapped to a resource for all $L_{PSSCH}$.

2) A resource through which ACK/NACK is to be transmitted within the PSFCH may be calculated. An index i of the resource through which ACK/NACK is to be transmitted may be calculated using Equation 1 below.

$$i=(P_{ID}+M_{ID}) \bmod R \qquad \text{[Equation 1]}$$

Here, $P_{ID}$ may be a physical layer source ID provided by the SCI Format 2-A and SCI Format 2-B. $M_{ID}$ may be an RX UE ID delivered from a higher layer in case of groupcast feedback, and may be set to 0 in other cases. R may be the total number of resources required for PSFCH transmission, and may be expressed as Equation 2.

$$R=M_s \cdot L_{PSSCH} \cdot Q,$$

$$Q \in \{1,2,3,6\} \qquad \text{[Equation 2]}$$

Here, Q may represent a preset cyclic shift pair index, and one value may be selected as $Q \in \{1,2,3,6\}$.

In the present disclosure, a method of configuring a feedback channel to reduce resources used for retransmission from the TX UE to RX UEs for the groupcast feedback option 1 will be proposed. The RX UE may receive SCI format 2-B configured as the feedback option 1, and if decoding of a TB fails, it may transmit a NACK to the TX UE when it is within a required communication range based on a zone ID of the TX UE. In the groupcast feedback option 1, when the TX UE receives the NACK, it does not know a ID of the RX UE and may retransmit the TB for which decoding has failed to the RX UEs within the required communication range. If there are multiple RX UEs within the required communication range, the TX UE may occupy resources to perform retransmission to all RX UEs.

In the present disclosure, a method in which the TX UE can recognize location information (e.g., zone IDs) of the RX UEs when supporting the groupcast feedback option 1 will be proposed.

FIG. 9 is a conceptual diagram illustrating an exemplary embodiment of configuration of TX-RX UEs and zone IDs thereof, according to an exemplary embodiment of the present disclosure.

Referring to FIG. 9, sidelink communication may include a TX UE, RX UE #1, RX UE #2, and RX UE #3, and an area may be divided into 36 zones. Each zone may have one ID. A zone ID of the TX UE may correspond to 8. A zone ID of the RX UE #1, a zone ID of the RX UE #2, and a zone ID of RX UE #3 may correspond to 16, 19, and 28, respectively. Even when the TX UE receives NACK information as HARQ feedback from the RX UE #1, it may perform retransmission of a TB also to the RX UE #2 and RX UE #3 within a configured required communication range. If the RX UE #1 is able to deliver HARQ feedback (e.g., NACK information) to the TX UE through a PSFCH resource together its zone ID or location information similar thereto, the TX UE may perform retransmission only for RX UEs located in the direction of the RX UE #1.

In the present disclosure, a method for configuring the zone ID in Equation 1 described above will be proposed. In the groupcast feedback option 1 scheme using SCI format 2-B, the RX UE ID (e.g., $M_{ID}$) in Equation 1 may be set to '0'. Equation 3 may be an equation regarding an index i' of a resource through which ACK/NACK configured based on the zone ID of the RX UE is to be transmitted.

$$i'=(P_{ID}+Z_{ID})\bmod R_z$$

$$R_z=M_s \cdot L_{PSSCH} \cdot Q_z \qquad \text{[Equation 3]}$$

Here, $Z_{ID}$ may be the zone ID of the RX UE delivered from the higher layer in the groupcast feedback option 1. $R_z$ may be the total number of resources required for the zone-based PSFCH transmission, and $Q_z$, as a cyclic shift pair index, may be configured as $Q_z \in Z_{ID}$.

As described above, the zone ID may have a maximum of $2^{12}$ values. The configuration proposed in the present disclosure may include the following method to reduce the increase in NACK calculation complexity due to $Z_{ID}$. Here, $Z_{ID}$ may refer to the zone ID of the RX UE delivered from the higher layer in the groupcast feedback option 1, as mentioned above.

Figure 10A:
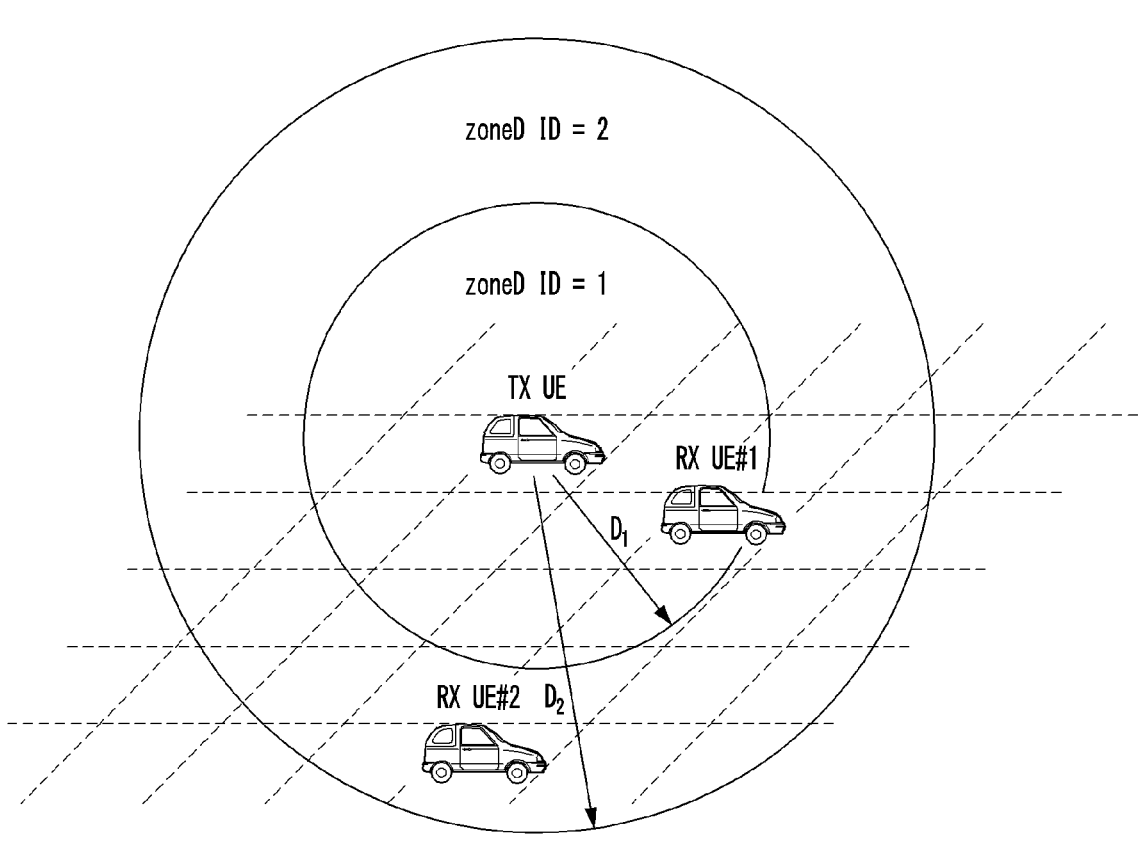
FIG. 10A is a conceptual diagram illustrating an exemplary embodiment of a method for configuring a zone ID of an RX UE based on distance information between TX UE and RX UE according to an exemplary embodiment of the present disclosure.

FIG. 10A is a conceptual diagram illustrating an exemplary embodiment of a method for configuring a zone ID of an RX UE based on distance information between TX UE and RX UE according to an exemplary embodiment of the present disclosure.

Referring to FIG. 10A, the SL communication system may include a TX UE, RX UE #1, and RX UE #2. Each of RX UE #1 and RX UE #2 may determine a zone to which the TX UE belongs based on a zone ID of the TX UE, which is delivered by the TX UE. Each of RX UE #1 and RX UE #2 may calculate a distance between the zone to which the TX UE belongs and the zone to which itself belongs, and acquire a zone ID obtained by converting the distance as distance information according to a distance section to which the calculated distance belongs. For convenience of description, the zone ID converted as the distance information may be expressed as a zone-D ID. The TX UE may limit a range of the retransmission target RX UES based on the Zone-D IDs. For convenience of description, two RX UEs (RX UE #1, RX UE #2) and two zone-D IDs are illustrated in FIG. 10A, but there may be multiple RX UEs and multiple zone-D IDs. The TX UE may divide the required communication range into a plurality of preconfigured zone-D IDs.

For example, if zone-D ID=1, the TX UE may limit the range of the retransmission target RX UEs to $D_1$. In addition, if zone-D ID=2, the TX UE may limit the range of the retransmitting target RX UEs to $D_2$. When the RX UE #1 is located in a zone indicated by the zone-D ID 1, NACK information may be detected by the same procedure as the existing feedback option 1 with $Q_z=1$ in Equation 3. The above-described method may be advantageous when receiving feedback from an RX UE in close proximity to the TX UE.

As another method, a method of configuring a zone ID of an RX UE based on direction information between the TX UE and the RX UE will be described.

Figure 10B:
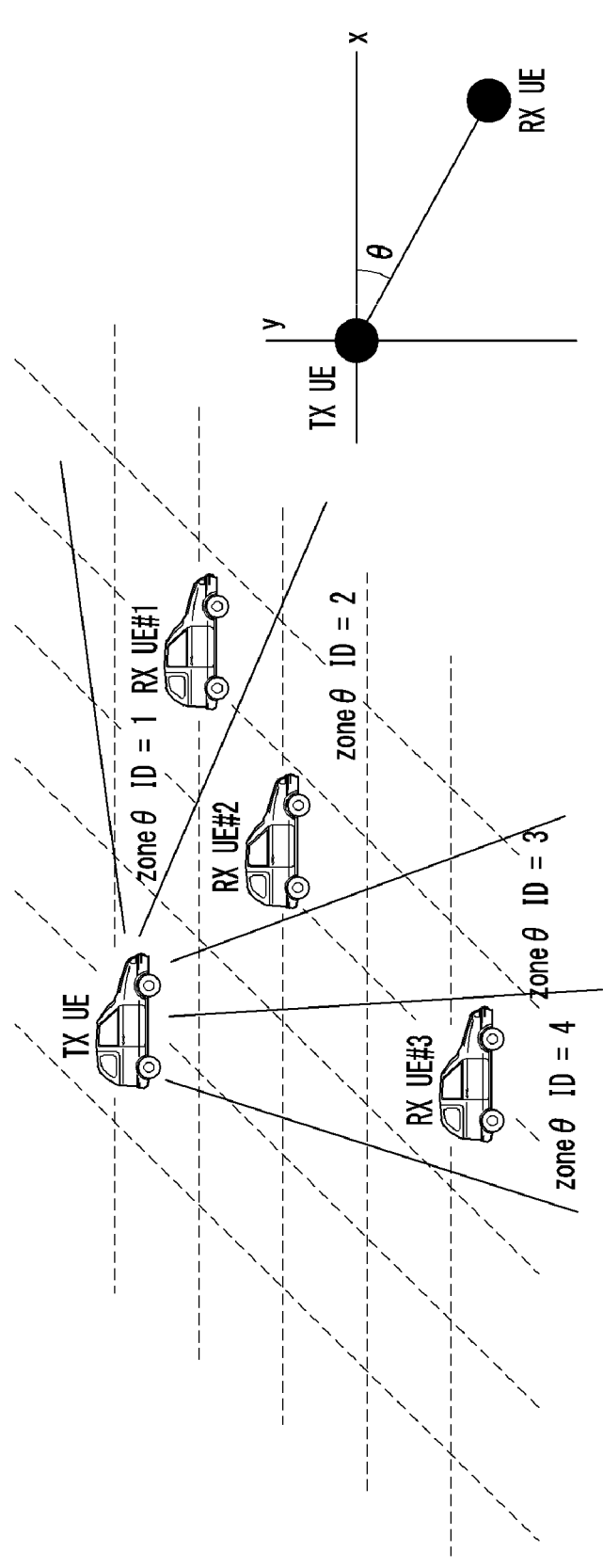
FIG. 10B is a conceptual diagram illustrating an exemplary embodiment of a method for configuring a zone ID of an RX UE based on direction information between TX UE and RX UE according to an exemplary embodiment of the present disclosure.

FIG. 10B is a conceptual diagram illustrating an exemplary embodiment of a method for configuring a zone ID of an RX UE based on direction information between TX UE and RX UE according to an exemplary embodiment of the present disclosure.

Referring to FIG. 10B, sidelink communication (e.g., NR V2X communication) may include a TX UE, RX UE #1, RX UE #2, and RX UE #3. Each of the RX UE #1, RX UE #2, and RX UE #3 may determine a zone to which the TX UE belongs based on a zone ID of the TX UE, which is delivered by the TX UE. Each of the RX UE #1, RX UE #2, and RX UE #3 may calculate a direction between the zone to which the TX UE belongs and the zone to which itself belongs, and acquire a zone ID obtained by converting the direction as direction information with respect to a reference direction section of the TX UE. The ID indicating the direction information of each of the RX UE #1, RX UE #2, and RX UE #3 may be used as the zone ID. For convenience of description, the zone ID defined as described above may be referred to as a zone-θ ID. For example, the RX UE #1 may be located in the direction corresponding to a zone-θ ID of 1, the RX UE #2 may be located in the direction corresponding to a zone-θ ID of 2, and the RX UE #3 may be located in the direction corresponding to a zone-θ ID of 3. Here, θ may mean an angle between the TX UE and RX UE. For convenience of description, 4 zone-θ IDs are shown in FIG. 10B, but a plurality of zone-θ IDs may exist, and the TX UE may divide the required communication range into a plurality of preset zone-θ IDs.

For example, when the RX UE is located in a zone corresponding to the zone-θ ID of 3, NACK may be detected at an index i' where $Q_z=3$ in Equation 3. The TX UE may perform retransmission only to UEs in the zone in the direction corresponding to the zone-θ ID of 3 through beamforming, and the like. In the above-described method, the maximum number of IDs may be determined depending on a beamforming resolution or the number of beams of the TX UE. Accordingly, a cyclic shift pair may be configured according to a capability such as beamforming of the TX UE, and a range of retransmission target terminals may be limited to a specific direction according to the zone-θ ID.

In addition, the methods described above with reference to FIGS. 10A and 10B may be used in combination.

Meanwhile, in the present disclosure, a symbol for AGC of a PSFCH may be used in a PSSCH slot including the PSFCH shown in FIG. 6. For convenience of description, a symbol for AGC of a PSFCH may be referred to as an AGC_PSFCH symbol.

In the present disclosure, it will be proposed to add a TX UE zone ID field to SCI format 2-A so that the AGC_PSFCH symbol can be used for separate PSFCH transmission. The SCI format 2-A with the TX UE zone ID field may be expressed as Table 2.

TABLE 2

| | Fields |
|---|---|
| SCI format 2-A | HARQ process number |
| | New data indicator (NDI) |
| | Redundancy version (RV) |
| | Source ID |
| | Destination ID |
| | HARQ feedback enable/disable indicator |
| | Cast type indicator |
| | CSI request |
| | Zone ID of TX UE |

Referring to Table 2, the SCI format 2-A may include at least one of a HARQ process number, NDI, RV, source ID, destination ID, HARQ feedback enable/disable indicator, cast type indicator, CSI request, or a zone ID of the TX UE. The zone ID of the TX UE is a newly added field, and the AGC_PSFCH symbol may be used for separate PSFCH transmission.

The Unicast feedback or the groupcast feedback option 2 may be configured through the SCI format 2-A. The RX UE may receive SCI the format 2-A and calculate a transmission power $$P_t^{RX\_UE}$$

based on the zone ID of the TX UE in the received SCI format 2-A. A Zadoff-Chu (ZC) sequence constituting the PSFCH has the advantage of good peak-to-average power ratio (PAPR) characteristics, so an AGC level sensitivity of a time domain signal may be relatively low. Therefore, the TX UE may receive the PSFCH symbol transmitted by the RX UE with the transmission power $$P_t^{RX\_UE}$$

without AGC adaptation or through a very small AGC level adjustment.

Hereinafter, a retransmission method and procedure in the NACK-only groupcast scheme according to the present disclosure will be described. The NACK-only groupcast method may be referred to as the NACK-based groupcast scheme.

Figure 11:
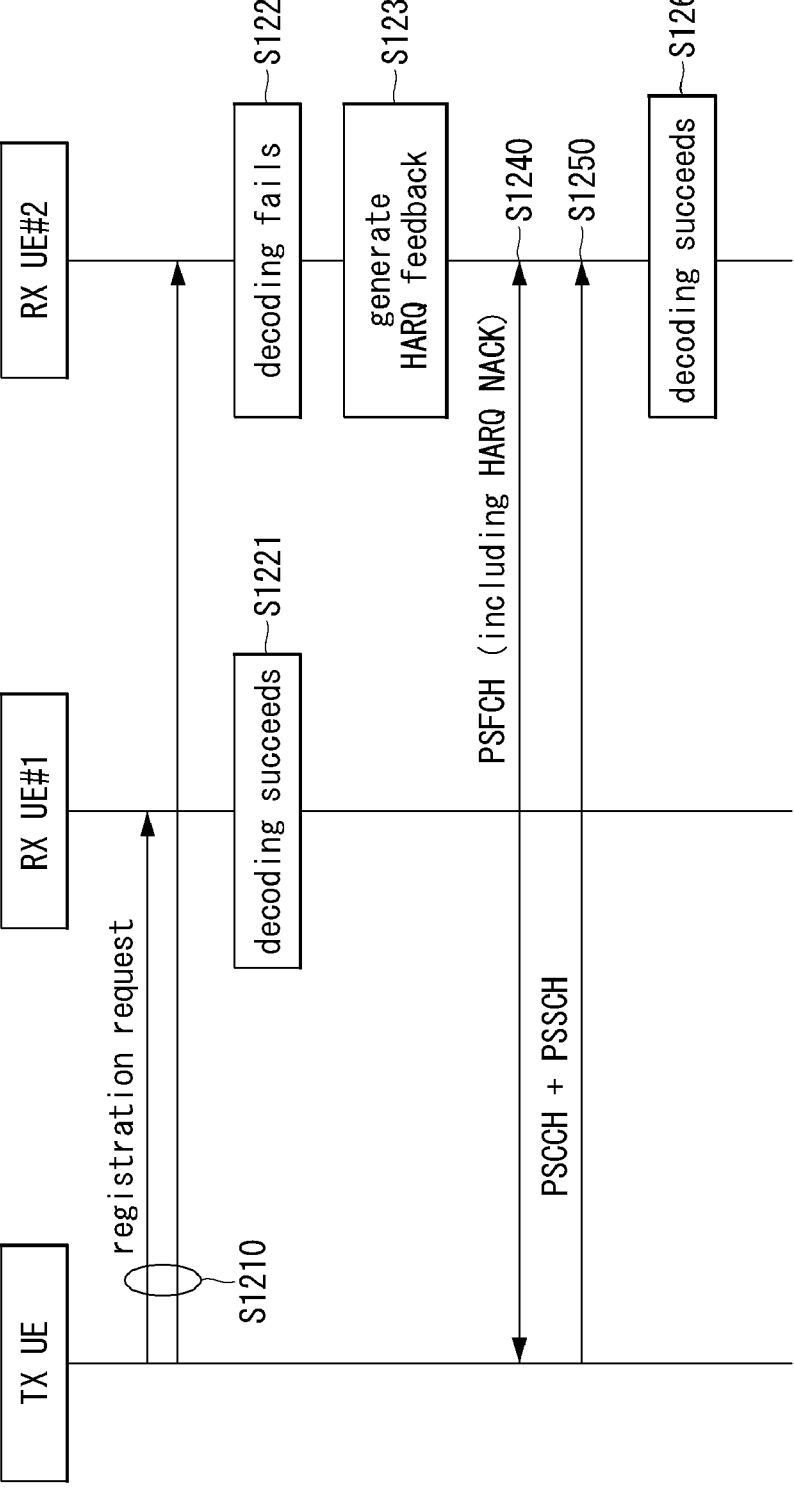
FIG. 11 is a sequence chart illustrating an exemplary embodiment of a NACK-only groupcast method and procedure in a communication system supporting sidelink communication according to an exemplary embodiment of the present disclosure.

FIG. 11 is a sequence chart illustrating an exemplary embodiment of a NACK-only groupcast method and procedure in a communication system supporting sidelink communication according to an exemplary embodiment of the present disclosure.

Referring to FIG. 11, the communication system may include a transmitting terminal (TX UE), a first receiving terminal (RX UE #1), and a second receiving terminal (RX UE #2). The transmitting terminal, first receiving terminal, and second receiving terminal shown in FIG. 11 may be configured identically or similarly to the communication node 200 shown in FIG. 2. The transmitting terminal may transmit SCI to the first receiving terminal and the second receiving terminal through a PSCCH and a PSSCH. The PSSCH may include data transmitted from the transmitting terminal to the first receiving terminal and the second receiving terminal. Each of the first receiving terminal and the second receiving terminal may obtain the SCI and data from the transmitting terminal by performing a monitoring operation on the PSCCH and/or PSSCH. Each of the first receiving terminal and the second receiving terminal may perform decoding on the received data. The first receiving terminal may successfully decode the received data, and the second receiving terminal may fail to decode the received data. The second receiving terminal may generate a HARQ feedback including NACK information and transmit the HARQ feedback to the transmitting terminal through a PSFCH. The transmitting terminal may retransmit the data to the second receiving terminal through a PSCCH and a PSSCH based on the HARQ feedback received from the second receiving terminal. Here, the transmitting terminal may transmit data to the first receiving terminal and the second receiving terminal using the NACK-based groupcast scheme. The first receiving terminal and the second receiving terminal may operate in the groupcast option 1, in which only NACK information is transmitted as HARQ feedback.

In a step S1210, the transmitting terminal (TX UE) may transmit SCI and/or data to the first receiving terminal (RX UE #1) and the second receiving terminal (RX UE #2) through a PSCCH and/or PSCCH. Each of the first receiving terminal and the second receiving terminal may obtain the SCI from the transmitting terminal by performing a monitoring operation on the PSCCH and/or PSSCH. The first receiving terminal and the second receiving terminal may receive the data (e.g., TB) based on the SCI. As described before, the transmitting terminal may transmit the data to the first receiving terminal and the second receiving terminal using the NACK-based groupcast scheme. The NACK-based groupcast scheme may be indicated by the SCI.

As described above, the SCI may include first-stage SCI and second-stage SCI. The first-stage SCI may be transmitted through the PSCCH, and the second-stage SCI may be transmitted through the PSSCH.

The first-stage SCI may include at least one information element among priority information, frequency resource assignment information, time resource assignment information, resource reservation period information, DMRS pattern information, second-stage SCI format information, beta_off-set indicator, number of DMRS ports, or modulation and coding scheme (MCS) information.

The second-stage SCI may include at least one information element among a HARQ processor identifier (ID), redundancy version (RV), source ID, destination ID, CSI request information, zone ID, or communication range requirement information.

Meanwhile, the first-stage SCI may be used for scheduling of the PSSCH and the second-stage SCI on the PSSCH. That is, the transmitting terminal may transmit the data (e.g., TB) to the first receiving terminal and the second receiving terminal based on scheduling by the first-stage SCI. The first receiving terminal and the second receiving terminal may receive the data transmitted by the transmitting terminal based on the first-stage SCI received from the transmitting terminal. The second-stage SCI may indicate the NACK-based groupcast scheme.

In steps S1221 and S1222, the first receiving terminal and the second receiving terminal may perform decoding (e.g., LDPC decoding) on the data (e.g., TB) received from the transmitting terminal in the step S1210. The first receiving terminal may successfully decode the data (S1221), and the second receiving terminal may fail to decode the data (S1222). The second receiving terminal may perform a step S1230.

In steps S1230 and S1240, the second receiving terminal may generate a HARQ feedback including NACK information indicating the failure of data decoding (S1230). The second receiving terminal may transmit the HARQ feedback generated in the step S1230 to the transmitting terminal through a PSFCH resource. The transmitting terminal may receive the HARQ feedback including NACK information from the second receiving terminal through the PSFCH resource (S1240).

Meanwhile, in the step S1221, the first receiving terminal may successfully decode the data and may not transmit a HARQ feedback including ACK information to the transmitting terminal. As described above, since the transmitting terminal transmits the data to the first receiving terminal and the second receiving terminal using the NACK-based group-cast scheme, the first receiving terminal and the second receiving terminal may operate in the groupcast option 1, in which transmits only NACK information is transmitted as a HARQ feedback.

In a step S1250, the transmitting terminal may retransmit the data to the second receiving terminal based on the HARQ feedback received from the second receiving terminal. The transmitting terminal may not retransmit the data to the first receiving terminal. The second receiving terminal may receive the data retransmitted from the transmitting terminal.

In a step S1260, the second receiving terminal may successfully decode the retransmitted data. The second receiving terminal may not transmit a HARQ feedback to the transmitting terminal.

In an exemplary embodiment, the first receiving terminal and the second receiving terminal may be located within a required communication range of the transmitting terminal. The transmitting terminal may transmit the data (e.g., TB) to the first receiving terminal and the second receiving terminal based on the NACK-based groupcast scheme. The first receiving terminal and the second receiving terminal may operate in the HARQ feedback option 1. Assume that a distance between the transmitting terminal and the first receiving terminal (e.g., D1 shown in FIG. 10A) is smaller than a distance between the transmitting terminal and the second receiving terminal (e.g., D2 shown in FIG. 10A). The transmitting terminal may include a plurality of preconfigured distance information indicating (dividing) the required communication range of the transmitting terminal. The plurality of preconfigured distance information indicating (dividing) the required communication range of the transmitting terminal may be (pre)configured in the first receiving terminal and the second receiving terminal. The distance between the transmitting terminal and the first receiving terminal may be indicated by one of the plurality of preconfigured distance information. That is, distance information between the transmitting terminal and the second receiving terminal may be one of the plurality of preconfigured distance information. Each of the plurality of preconfigured distance information may correspond to a zone-D ID. Here, some of the plurality of preconfigured distance information may not overlap each other.

In an exemplary embodiment, the transmitting terminal may transmit a zone ID and a communication range requirement of the transmitting terminal to the first receiving terminal and the second receiving terminal through the second-stage SCI. The first receiving terminal and the second receiving terminal may obtain the zone ID and communication range requirements of the transmitting terminal through the second-stage SCI. The first receiving terminal and the second receiving terminal may calculate the required communication range of the transmitting terminal based on the acquired communication range requirement information. The first receiving terminal and the second receiving terminal may calculate distance information from the transmitting terminal using the zone ID of the transmitting terminal and their own zone IDs, respectively. The first receiving terminal may fail to decode the data (e.g., TB) received from the transmitting terminal. On the other hand, the second receiving terminal may successfully decode the data received from the transmitting terminal. The first receiving terminal may transmit a HARQ feedback including NACK information to the transmitting terminal. On the other hand, the second receiving terminal may not transmit a HARQ feedback to the transmitting terminal.

In an exemplary embodiment, the transmitting terminal may provide a source ID through the second-stage SCI. As described above in FIG. 10A, the first receiving terminal may convert a distance difference (e.g., D1) between a zone indicated by the zone ID of the transmitting terminal and a zone indicated by a zone ID of the first receiving terminal to a zone-D ID (e.g., zone-D ID 1). The first receiving terminal may determine an index of a PFSCH resource through which the HARQ feedback including NACK information is to be transmitted based on the source ID provided by the transmitting terminal and the zone-D ID. The source ID provided by the transmitting terminal may correspond to $P_{ID}$ in Equation 3, and the zone-D ID of the first receiving terminal may correspond to $Z_{ID}$ in Equation 3. The index of the PFSCH resource may correspond to i' in Equation 3. Here, the index of the PFSCH resource may correspond to a circularly shifted Zadoff-Chu (ZC) sequence to be transmitted through the PFSCH resource.

In an exemplary embodiment, the first receiving terminal may transmit the HARQ feedback including NACK information to the transmitting terminal, and the transmitting terminal may receive the HARQ feedback including NACK information from the first receiving terminal through the PSFCH. The HARQ feedback including NACK information may correspond to a ZC sequence cyclically-shifted based on the zone D-ID of the first receiving terminal. The transmitting terminal may determine whether NACK information has been received for at least one of the first receiving terminal and the second receiving terminal based on a plurality of preconfigured zone-D IDs. In other words, the transmitting terminal may detect the zone-D ID (e.g., zone-D ID 1) used for transmission of NACK information in the first receiving terminal for HARQ feedback received through the PSFCH, and the transmitting terminal may determine that the NACK information has been received from at least one of the first receiving terminal or the second receiving terminal.

In an exemplary embodiment, when the transmitting terminal determines that the NACK information has been received from at least one of the first receiving terminal or the second receiving terminal, the transmitting terminal may limit a retransmission range of the data (e.g., TB) based on the detected zone-D ID. That is, the transmitting terminal may retransmit the data to the first receiving terminal located within the retransmission range. Here, each of the plurality of preconfigured zone-D IDs may correspond to a distance section based on the zone-ID of the transmitting terminal.

Meanwhile, in an exemplary embodiment, there may be at least one third receiving terminal having the same zone-D ID as the first receiving terminal. The transmitting terminal may retransmit the data to the at least one third receiving terminal. The at least one third receiving terminal may receive the data retransmitted from the transmitting terminal.

In another exemplary embodiment, the first receiving terminal and the second receiving terminal may be located within the required communication range of the transmitting terminal. The transmitting terminal may transmit the data (e.g., TB) to the first receiving terminal and the second receiving terminal based on the groupcast scheme. The first receiving terminal and the second receiving terminal may operate in the HARQ feedback option 1. It may be assumed that direction information between the transmitting terminal and the first receiving terminal and direction information between the transmitting terminal and the first receiving terminal are different. The transmitting terminal may configure a plurality of preconfigured direction information indicating (dividing) the required communication range. The plurality of preconfigured direction information dividing (divides) the required communication range of the transmitting terminal may be (pre)configured in the first receiving terminal and the second receiving terminal. The direction information between the transmitting terminal and the first receiving terminal may be one of the plurality of preconfigured direction information. The direction information between the transmitting terminal and the second receiving terminal may be one of the plurality of preconfigured direction information. Each of the plurality of preconfigured direction information may correspond to a zone-θ ID. Here, the plurality of preconfigured direction information may be information that divide the required communication range, and the plurality of preconfigured direction information may not overlap with each other.

In another exemplary embodiment, the transmitting terminal may transmit the zone ID and communication range requirement of the transmitting terminal to the first receiving terminal and the second receiving terminal through the second-stage SCI. The first receiving terminal and the second receiving terminal may obtain the zone ID and communication range requirement of the transmitting terminal through the second-stage SCI. The first receiving terminal and the second receiving terminal may calculate the required communication range of the transmitting terminal based on the obtained communication range requirement. The first receiving terminal and the second receiving terminal may calculate direction information with the transmitting terminal using the zone ID of the transmitting terminal and their own zone ID, respectively. The first receiving terminal may successfully decode the data (e.g., TB) received from the transmitting terminal. The second receiving terminal may fail to decode the data received from the transmitting terminal. The first receiving terminal may not transmit a HARQ feedback to the transmitting terminal. On the other hand, the second receiving terminal may transmit a HARQ feedback including NACK information to the transmitting terminal.

In another exemplary embodiment, the transmitting terminal may provide the source ID through the second-stage SCI. As described above with reference to FIG. 10B, the second receiving terminal may convert the direction information indicating a direction from a zone indicated by the zone ID of the transmitting terminal to a zone indicated by a zone ID of the receiving terminal to a zone-θ ID (e.g., zone-θ ID 2). The second receiving terminal may determine an index of a PSFCH resource through which the HARQ feedback including NACK information is to be transmitted based on the source ID provided by the transmitting terminal and the zone-θ ID. The source ID provided by the transmitting terminal may correspond to $P_{ID}$ in Equation 3, and the zone-θ ID of the second receiving terminal may correspond to $Z_{ID}$ in Equation 3. The index of the PFSCH resource may correspond to i' in Equation 3. Here, the index of the PFSCH resource may correspond to a cyclically-shifted ZC sequence to be transmitted through the PFSCH resource.

In another exemplary embodiment, the second receiving terminal may transmit the HARQ feedback including NACK information to the transmitting terminal, and the transmitting terminal may receive the HARQ feedback including NACK information from the second receiving terminal through the PSFCH. The HARQ feedback including NACK information may correspond to a ZC sequence cyclically-shifted based on the zone-θ ID of the second receiving terminal. The transmitting terminal may determine whether NACK information has been received from at least one of the first receiving terminal or the second receiving terminal based on the plurality of preconfigured zone-θ IDs. In other words, the transmitting terminal may detect the zone-θ ID (e.g., zone-θ ID 2) used for transmission of NACK information by the second receiving terminal from the HARQ feedback received through the PSFCH, and the transmitting terminal may determine that NACK information has been received from at least one of the first receiving terminal or the second receiving terminal.

In another exemplary embodiment, when the transmitting terminal determines that NACK information has been received from at least one of the first receiving terminal or the second receiving terminal, the transmitting terminal may limit a retransmission direction of the data (e.g., TB) based on the detected zone-θ ID. In other words, the transmitting terminal may retransmit the data to the second receiving terminal located in the retransmission direction through beamforming. Here, each of the plurality of preconfigured zone-θ IDs may correspond to direction information based on the zone ID of the transmitting terminal. The direction information between the transmitting terminal and the receiving terminal may be determined according to a beamforming resolution or the number of beamformed beams of the transmitting terminal.

Meanwhile, in another exemplary embodiment, there may be at least one third receiving terminal having the same zone-θ ID as that of the second receiving terminal. The transmitting terminal may retransmit the data to the at least one third receiving terminal. The at least one third receiving terminal may receive the data retransmitted from the transmitting terminal.

In another exemplary embodiment, the first receiving terminal and the second receiving terminal may be located within the required communication range of the transmitting terminal. The transmitting terminal may transmit data (e.g., TB) to the first receiving terminal and the second receiving terminal based on the NACK-based groupcast scheme. The first receiving terminal and the second receiving terminal may operate in the HARQ feedback option 1. It may be assumed that a distance between the transmitting terminal and the first receiving terminal (e.g., D1 shown in FIG. 10A) is smaller than a distance between the transmitting terminal and the second receiving terminal (e.g., D2 shown in FIG. 10A). The transmitting terminal may configure a plurality of preconfigure distance information indicating (dividing) the required communication range. The plurality of preconfigured distance information that divides (divides) the required communication range of the transmitting terminal may be (pre)configured in the first receiving terminal and the second receiving terminal. The distance=information between the transmitting terminal and the first receiving terminal may be one of the plurality of preconfigured distance information. The distance information between the transmitting terminal and the second receiving terminal may be one of the plurality of preconfigured distance difference information. Each of the plurality of preconfigured distance information may correspond to a zone-D ID. Here, the plurality of preconfigured distance information may not overlap each other.

In another exemplary embodiment, the transmitting terminal may transmit a zone ID and a communication range requirement of the transmitting terminal to the first receiving terminal and the second receiving terminal through the second-stage SCI. The first receiving terminal and the second receiving terminal may obtain the zone ID and communication range requirement of the transmitting terminal through the second-stage SCI. The first receiving terminal and the second receiving terminal may calculate the required communication range of the transmitting terminal based on the obtained communication range requirement. The first receiving terminal and the second receiving terminal may calculate the distance information from the transmitting terminal using the zone ID of the transmitting terminal and their own zone ID, respectively. The first receiving terminal may successfully decode the data (e.g., TB) received from the transmitting terminal. On the other hand, the second receiving terminal may fail to decode the data (e.g., TB) received from the transmitting terminal. The first receiving terminal may not transmit a HARQ feedback to the transmitting terminal. On the other hand, the second receiving terminal may transmit a HARQ feedback including NACK information to the transmitting terminal.

In another exemplary embodiment, the transmitting terminal may provide the source ID through the second-stage SCI. As described above in FIG. 10A, the second receiving terminal may covert a distance between a zone indicated by the zone ID of the transmitting terminal and a zone indicated by the zone ID of the second receiving terminal to a zone-D ID (e.g., zone-D ID 2). The second receiving terminal may determine an index of a PFSCH resource through which the HARQ feedback including NACK information is to be transmitted based on the source ID provided by the transmitting terminal and the zone-D ID. The source ID provided by the transmitting terminal may correspond to $P_{ID}$ in Equation 3, and the zone-D ID of the second receiving terminal may correspond to $Z_{ID}$ in Equation 3. The index of the PFSCH resource may correspond to i' in Equation 3. Here, the index of the PFSCH resource may correspond to a cyclically-shifted ZC sequence to be transmitted through the PFSCH resource.

In another exemplary embodiment, when the transmitting terminal determines that NACK information has been received from at least one of the first receiving terminal or the second receiving terminal, the transmitting terminal may limit a retransmission range of the data (e.g., data) based on the detected zone-D ID. In other words, the transmitting terminal may retransmit data to the second receiving terminal located within the retransmission range.

Meanwhile, in another exemplary embodiment, there may be at least one third receiving terminal having the same zone-D ID as that of the second receiving terminal. The transmitting terminal may retransmit the data to the at least one third receiving terminal. The at least one third receiving terminal may receive the data retransmitted from the transmitting terminal.

In the above-described exemplary embodiments, the maximum number of preconfigured distance information and the maximum number of preconfigured direction information may be limited by a ZC sequence. In the present disclosure, although the exemplary embodiments using a ZC sequence have been described but the present disclosure is not limited thereto. A sequence other than the ZC sequence may be used.

In the present disclosure, a symbol used to transmit the existing AGC_PSFCH symbol may be configured as a PSFCH transmission symbol under the premise that the RX UE can receive the zone ID of the TX UE in SCI format 2-A. In PSFCH transmission, a sidelink feedback method supporting multiple minimum slots K required for feedback transmission will be described.

Figure 12A:
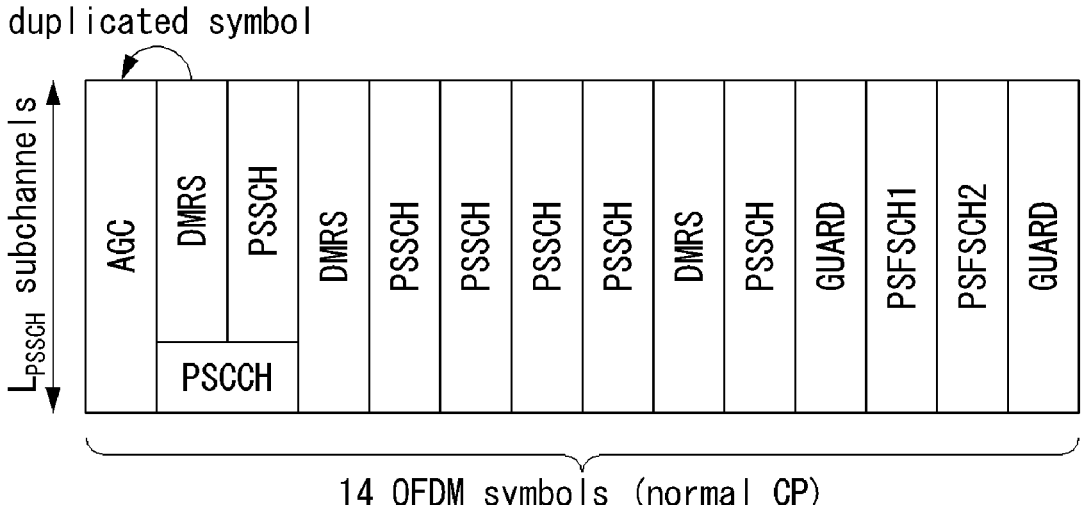
FIG. 12A is a conceptual diagram illustrating a proposed sidelink channel configuration method provided by introducing the zone-ID of the TX UE in second-stage SCI.
Figure 12B:
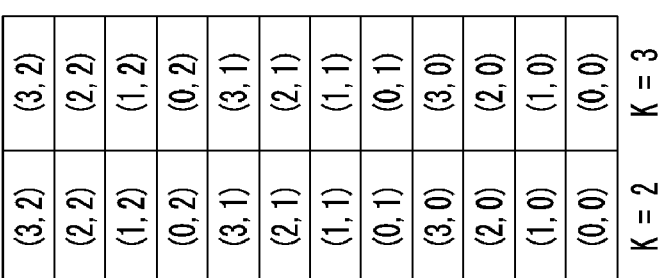
FIG. 12B is a conceptual diagram illustrating an exemplary embodiment of a feedback method supporting multiple K. Here, it may be assumed that the RX UE can receive the zone-ID of the TX UE in SCI format 2-A.
Figure 12B:
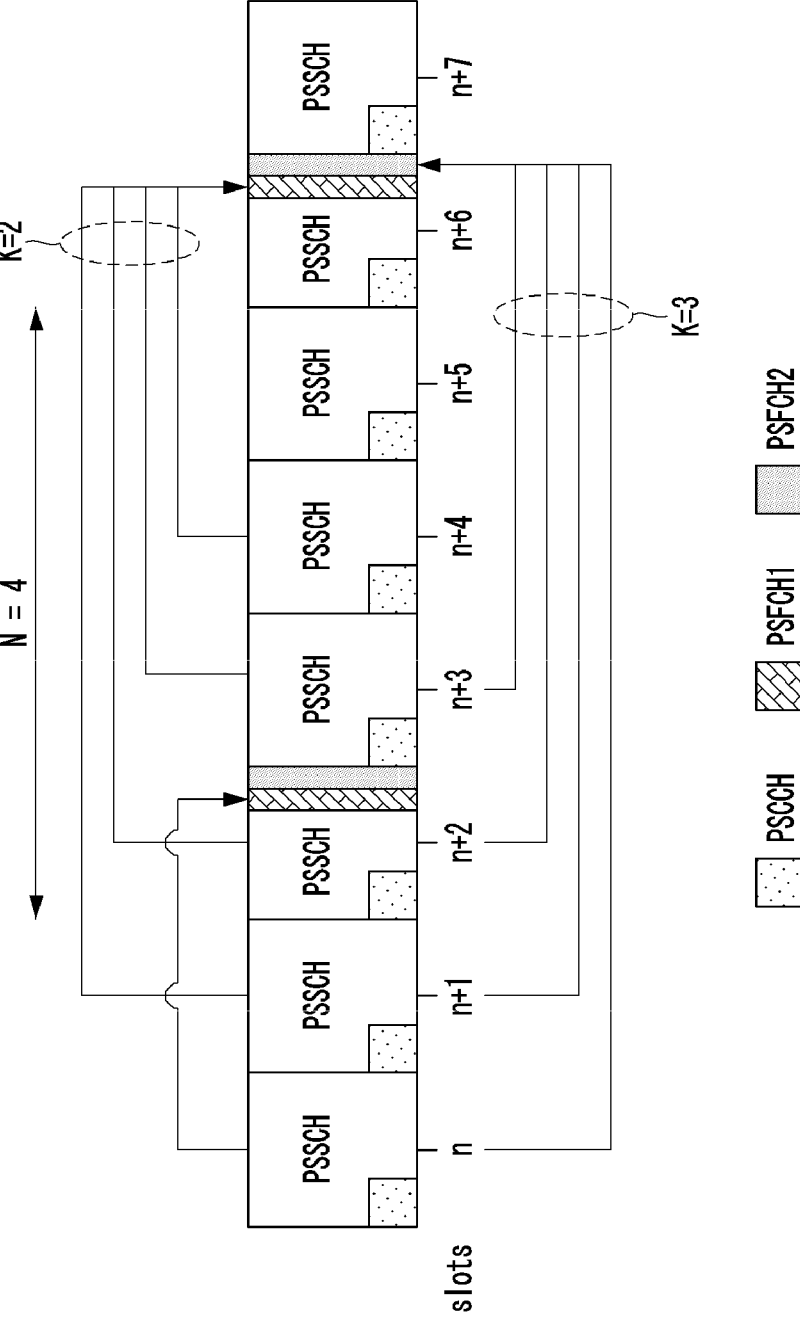

FIG. 12A is a conceptual diagram illustrating a proposed sidelink channel configuration method provided by introducing the zone-ID of the TX UE in second-stage SCI, and FIG. 12B is a conceptual diagram illustrating an exemplary embodiment of a feedback method supporting multiple K. Here, it may be assumed that the RX UE can receive the zone-ID of the TX UE in SCI format 2-A.

Referring to FIG. 12A, a sidelink channel configuration may include a PSFCH1 symbol and a PSFCH2 symbol. The PSFCH1 symbol may be used to transmit a HARQ feedback instead of the existing AGC_PSFCH symbol in SCI format 2-A. Here, it may be assumed that the RX UE can receive the zone-ID of the TX UE in SCI format 2-A.

Referring to FIG. 12B, the RX UE may transmit a PSFCH every 4 slots. ACK/NACK information for a TB of a PSSCH in a slot n cannot be fed back in a PSFCH in a slot n+2, and can be fed back in a transmission slot corresponding to a PSFCH resource in a slot n+6 as being delayed by 4 slots. However, the feedback for the TB of the PSSCH in the slot n may be transmitted in the slot n+2 according to the feedback method supporting multiple K proposed in the present disclosure.

For example, the SCI (e.g., SCI format 2-A) transmitted by the transmitting terminal may include information indicating that the existing AGC symbol is used as a PSFCH symbol. The zone ID of the TX UE included in the SCI transmitted by the transmitting terminal may indicate that the existing AGC symbol is used as a PSFCH symbol.

In FIGS. 12A and 12B, the OFDM symbol used as the existing AGC_PFSCH symbol may be used to transmit a feedback for K=2. The existing PSFCH symbol may be used to transmit a feedback for K=3. According to the proposed method, a feedback on the TB of the PSSCH in the slots n and n+4 may be quickly fed back in the slots n+2 and n+6, which are the immediately following PFSCH transmission slots. In addition, since multiple Ks, i.e., (K=2) and (K=3), are supported, the index (i or i') for the RB(s) through which ACK/NACK information constituting the PSFCH is to be transmitted can be calculated differently. As a result, even ACK/NACKs for the same slot number are transmitted in different RB regions and different PSFCH symbols, so a frequency/time diversity effect can be obtained.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a first terminal, the method comprising:
transmitting first sidelink control information (SCI) to a second terminal and a third terminal;
transmitting a first transport block (TB) to the second terminal and the third terminal based on scheduling by the first SCI;
receiving a hybrid automatic repeat request (HARQ) feedback including negative acknowledgment (NACK) information for the first TB through a first physical sidelink feedback channel (PSFCH) resource, the first PSFCH resource being determined based on a distance between the first terminal and each of the second terminal and the third terminal;
determining whether NACK information for at least one terminal among the second terminal and the third terminal has been received, based on the HARQ feedback;
detecting the distance of each of the second terminal and the third terminal with respect to the first terminal based on the first PSFCH resource;
identifying at least one retransmission target terminal among the second terminal and the third terminal based on the distance; and
retransmitting the first TB to the at least one retransmission target terminal.

2. The method according to claim 1, wherein the first terminal, the second terminal, and the third terminal each perform sidelink (SL) communication in a NACK-based groupcast scheme, and the second terminal and the third terminal are located within a required communication range of the first terminal.

3. The method according to claim 1, wherein the first PSFCH resource includes at least one of an automatic gain control (AGC) symbol or a PSFCH symbol.

4. The method according to claim 1, wherein the at least one retransmission target terminal is further identified based on direction information of each of the second terminal and the third terminal with respect to the first terminal.

5. The method according to claim 1, wherein the retransmitting of the first TB comprises:
transmitting second SCI to the at least one retransmission target terminal; and
retransmitting the first TB to the at least one retransmission target terminal based on scheduling by the second SCI.

6. The method according to claim 4, wherein a plurality of preconfigured direction information are determined based on a resolution or a number of beams in beamforming of the first terminal.

7. A method for a second terminal, comprising:
receiving first sidelink control information (SCI) including location information of a first terminal from the first terminal;
receiving a first transport block (TB) from the first terminal based on scheduling by the first SCI;
determining whether to transmit negative acknowledgment (NACK) information for the first TB;
determining a distance between the first terminal and the second terminal based on a zone ID of the first terminal and a zone ID of the second terminal;
determining a first physical sidelink feedback channel (PSFCH) resource based on the distance;
transmitting, to the first terminal, a hybrid automatic repeat request (HARQ) feedback including the NACK information through the first PSFCH resource; and
receiving the first TB retransmitted from the first terminal,
wherein the distance is determined based on the location information of the first terminal and location information of the second terminal.

8. The method according to claim 7, wherein sidelink (SL) communication between the first terminal and the second terminal is indicated by the first SCI to be performed in a NACK-based groupcast scheme, the second terminal is located within a required communication range of the first terminal, and the required communication range is indicated by the first SCI.

9. The method according to claim 7, wherein the first PSFCH resource includes at least one of an automatic gain control (AGC) symbol or a PSFCH symbol.

10. The method according to claim 7, wherein the HARQ feedback is further transmitted based on direction information between the first terminal and the second terminal, the direction information being determined based on the location information of the first terminal and the location information of the second terminal.

11. The method according to claim 7, wherein the receiving of the retransmitted first TB comprises:
receiving second SCI from the first terminal; and
receiving the retransmitted first TB based on scheduling by the second SCI.

12. The method according to claim 10, wherein the distance is one of a plurality of preconfigured distances and the direction is one of a plurality of preconfigured direction information.

13. The method according to claim 12, wherein the plurality of preconfigured direction information are determined based on a resolution or a number of beams in beamforming of the first terminal.

14. A first terminal comprising at least one processor, wherein the at least one processor causes the first terminal to perform:

transmitting first sidelink control information (SCI) to a second terminal and a third terminal;

transmitting a first transport block (TB) to the second terminal and the third terminal based on scheduling by the first SCI;

receiving a hybrid automatic repeat request (HARQ) feedback including negative acknowledgment (NACK) information for the first TB through a first physical sidelink feedback channel (PSFCH) resource, the first PSFCH resource being determined based on a distance between the first terminal and each of the second terminal and the third terminal;

determining whether NACK information for at least one terminal among the second terminal and the third terminal has been received, based on the HARQ feedback;

detecting the distance of each of the second terminal and the third terminal with respect to the first terminal based on the first PSFCH resource;

identifying at least one retransmission target terminal among the second terminal and the third terminal based on the distance; and retransmitting the first TB to the at least one retransmission target terminal.

15. The first terminal according to claim 14, wherein the first terminal, the second terminal, and the third terminal each perform sidelink (SL) communication in a NACK-based groupcast scheme, and the second terminal and the third terminal are located within a required communication range of the first terminal.

16. The first terminal according to claim 14, wherein the first PSFCH resource includes at least one of an automatic gain control (AGC) symbol or a PSFCH symbol.

17. The first terminal according to claim 14, wherein the at least one retransmission target terminal is further identified based on direction information of each of the second terminal and the third terminal with respect to the first terminal.

18. The first terminal according to claim 17, wherein a plurality of preconfigured direction information are determined based on a resolution or a number of beams in beamforming of the first terminal.

* * * * *